United States Patent
Yang et al.

(10) Patent No.: US 9,516,673 B2
(45) Date of Patent: *Dec. 6, 2016

(54) COMMUNICATION METHOD USING A CARRIER AGGREGATION AND APPARATUS THEREFORE

(71) Applicant: LG ELECTRONICS INC., Seoul (KR)

(72) Inventors: Suck Chel Yang, Anyang-si (KR); Dong Youn Seo, Anyang-si (KR); Min Gyu Kim, Anyang-si (KR); Joon Kui Ahn, Anyang-si (KR); Jung Hoon Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/566,540

(22) Filed: Dec. 10, 2014

(65) Prior Publication Data

US 2015/0163038 A1   Jun. 11, 2015

Related U.S. Application Data

(63) Continuation of application No. 13/619,646, filed on Sep. 14, 2012, which is a continuation of application
(Continued)

(30) Foreign Application Priority Data

Apr. 5, 2010   (KR) .................. 10-2010-0030753

(51) Int. Cl.
*H04W 74/00*   (2009.01)
*H04L 5/00*   (2006.01)
(Continued)

(52) U.S. Cl.
CPC ............ *H04W 74/004* (2013.01); *H04L 5/001* (2013.01); *H04L 5/0005* (2013.01); *H04L 5/0053* (2013.01);
(Continued)

(58) Field of Classification Search
None
See application file for complete search history.

(56) References Cited

U.S. PATENT DOCUMENTS 7,414,964 B2   8/2008   Hashem et al.
2006/0013185 A1   1/2006   Seo et al.
(Continued)

FOREIGN PATENT DOCUMENTS

CN   1973457 A   5/2007
JP   2007-110529 A   4/2007
(Continued)

OTHER PUBLICATIONS

U.S. Appl. No. 13/619,646, filed Sep. 14, 2012.
(Continued)

*Primary Examiner* — Kodzovi Acolatse
(74) *Attorney, Agent, or Firm* — Birch, Stewart, Kolasch & Birch, LLP

(57) ABSTRACT

A method for a base station to receive an uplink transmission from a user equipment configured with multiple uplink component carriers in a wireless communications system. The method according to one embodiment includes transmitting, to the user equipment, Radio Resource Control (RRC) configuration information for a Sounding Reference Signal (SRS), the RRC configuration information including information for periodically receiving the SRS from the user equipment; transmitting, to the user equipment, Layer 2 (L2) control information indicating states of the plurality of uplink component carriers; and performing a procedure for
(Continued)

periodically receiving the SRS from the user equipment on a corresponding uplink component carrier in use of the RRC configuration information. According to whether the corresponding uplink component carrier is in an available state or a non-available state at a time for receiving the SRS, the SRS or no SRS is received from the user equipment, respectively.

4 Claims, 15 Drawing Sheets

Related U.S. Application Data

No. 13/376,740, filed as application No. PCT/KR2010/003112 on May 17, 2010, now Pat. No. 8,331,401.

(60) Provisional application No. 61/185,185, filed on Jun. 8, 2009, provisional application No. 61/187,634, filed on Jun. 16, 2009, provisional application No. 61/300,833, filed on Feb. 3, 2010.

(51) Int. Cl.
*H04W 72/04* (2009.01)
*H04W 88/08* (2009.01)

(52) U.S. Cl.
CPC .......... *H04L 5/0057* (2013.01); *H04W 72/042* (2013.01); *H04W 72/0413* (2013.01); *H04W 72/0453* (2013.01); *H04W 88/08* (2013.01)

(56) References Cited

U.S. PATENT DOCUMENTS

| | | |
|---|---|---|
| 2006/0126493 A1 | 6/2006 | Hashem et al. |
| 2006/0203780 A1 | 9/2006 | Terry |
| 2006/0280142 A1 | 12/2006 | Damnjanovic et al. |
| 2008/0026744 A1 | 1/2008 | Frederiksen et al. |
| 2008/0045231 A1 | 2/2008 | Kuroda et al. |
| 2008/0253336 A1 | 10/2008 | Parkvall et al. |
| 2008/0310360 A1 | 12/2008 | Heo et al. |
| 2009/0042553 A1 | 2/2009 | Lavi |
| 2009/0103482 A1 | 4/2009 | Imamura et al. |
| 2009/0270120 A1 | 10/2009 | Park |
| 2010/0020852 A1 | 1/2010 | Erell et al. |
| 2010/0061284 A1 | 3/2010 | Chen et al. |
| 2010/0098012 A1* | 4/2010 | Bala et al. ................... 370/329 |
| 2010/0118720 A1 | 5/2010 | Gauvreau et al. |
| 2010/0118746 A1 | 5/2010 | Gerlach |
| 2010/0130137 A1 | 5/2010 | Pelletier et al. |
| 2010/0130219 A1* | 5/2010 | Cave et al. ................... 455/450 |
| 2010/0195583 A1 | 8/2010 | Nory et al. |
| 2010/0215011 A1 | 8/2010 | Pan et al. |
| 2010/0227569 A1 | 9/2010 | Bala et al. |
| 2010/0232373 A1 | 9/2010 | Nory et al. |
| 2010/0232382 A1* | 9/2010 | Gauvreau ............. H04W 72/02 370/329 |
| 2010/0234037 A1 | 9/2010 | Terry et al. |
| 2010/0238986 A1 | 9/2010 | Gholmieh et al. |
| 2010/0246561 A1 | 9/2010 | Shin et al. |
| 2010/0271970 A1* | 10/2010 | Pan et al. ....................... 370/252 |
| 2010/0273515 A1 | 10/2010 | Fabien et al. |
| 2011/0002276 A1 | 1/2011 | Chen et al. |
| 2011/0002281 A1 | 1/2011 | Terry et al. |
| 2011/0034175 A1 | 2/2011 | Fong et al. |
| 2011/0142009 A1 | 6/2011 | Lindoff et al. |
| 2012/0093000 A1 | 4/2012 | Jeong et al. |
| 2015/0055602 A1 | 2/2015 | Jersenius et al. |

FOREIGN PATENT DOCUMENTS

| | | |
|---|---|---|
| JP | 2008-456255 A | 12/2008 |
| JP | 2010-524328 A | 7/2010 |
| JP | 2010-212893 A | 9/2010 |
| JP | 2010-541465 A | 12/2010 |
| KR | 10-0706981 B1 | 4/2007 |
| WO | WO 2008/042187 A2 | 4/2008 |
| WO | WO 2009/045139 A1 | 4/2009 |
| WO | WO 2009/054521 A1 | 4/2009 |

OTHER PUBLICATIONS

U.S. Appl. No. 13/619,698, filed Sep. 14, 2012.
LG Electronics, "UL control channel design to support carrier aggregation," 3GPP TSG RAN WG1 #56bis, R1-091204, Seoul, Korea, Mar. 23-27, 2009, 6 pages.
ZTE, "Downlink control structure for LTE-A," 3GPP TSG-RAN WG1 meeting #56, R1-090628, Athens, Greece, Feb. 9-13, 2009, 5 pages.
Bergman et al., "Continued HSPA Evolution of mobile broadband," Ericsson Review, 2009, 5 pages.
Johansson et al., "Multi-Carrier HSPA Evolution," IEEE, 2009, pp. 1-5.
LG Electronics, "UE-specific Carrier Assignment for LTE-Advanced," 3GPP TSG RAN WG1 Meeting #57, May 4-8, 2009, pp. 1-3, R1-092126.
Li, Cellular Networks, COS 461: Computer Networks, Apr. 18, 2012, pp. 1-5.
LTE, "Evolved Universal Terrestrial Radio Access (E-UTRA); Medium Access Conrol (MAC) protocol specification (3GPP TS 36.321 version 9.0.0 Release 9)," Oct. 2009, pp. 1-9; 27-29.
LTE, "Evolved Universal Terrestrial Radio Access (E-UTRA); Physical layer procedures (3GPP TS 36.213 version 9.0.1 Release 9)," Jan. 2010, pp. 1-9; 41-49.
Rosen et of "Understanding RRC State Dynamics through Client Measurements with Mobilyzer," University of Michigan, Sep. 7, 2014, 3 pages.

\* cited by examiner

Fig. 2
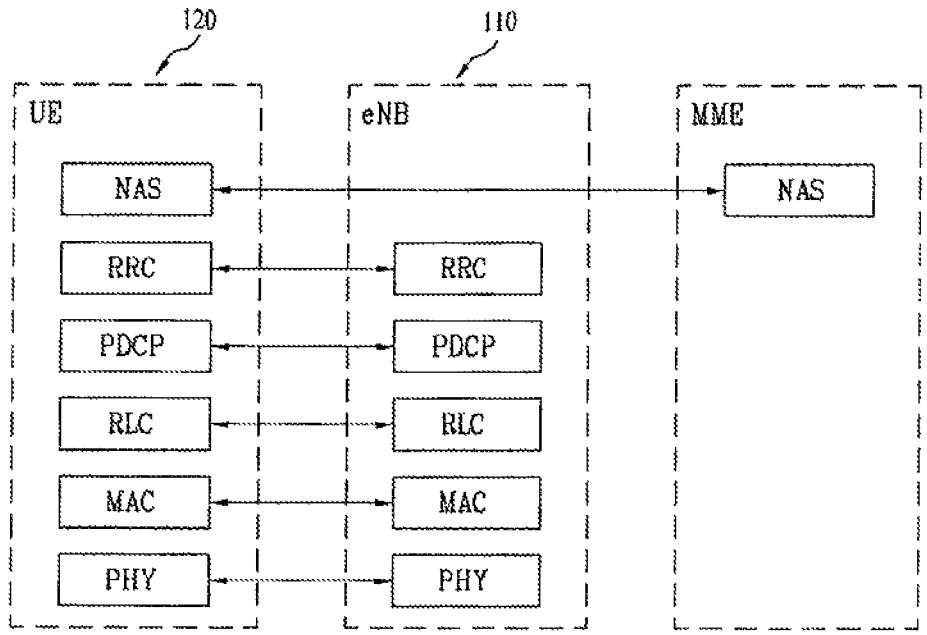
(a) Control-plane protocol stack
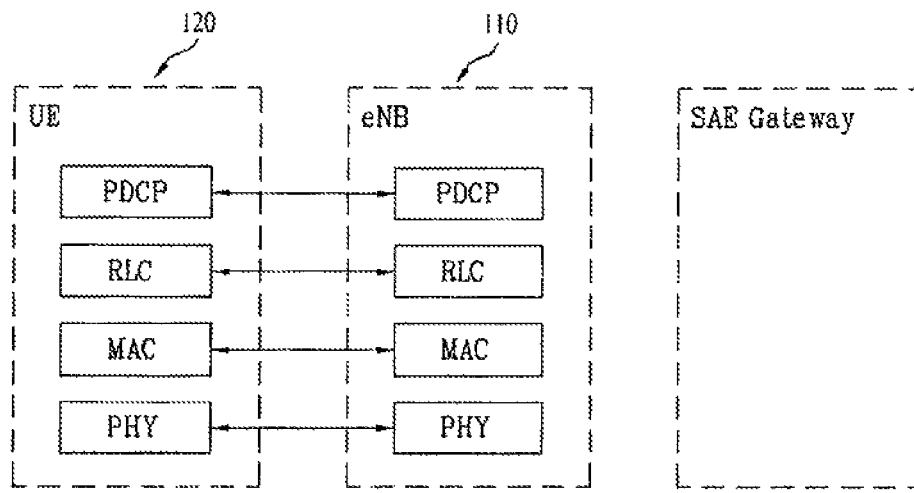
(b) User-plane protocol stack
Fig. 3
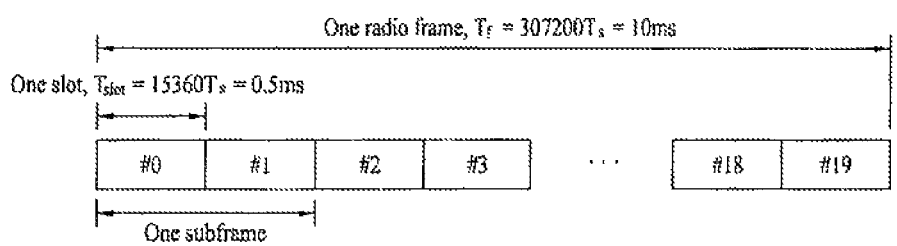

Fig. 4
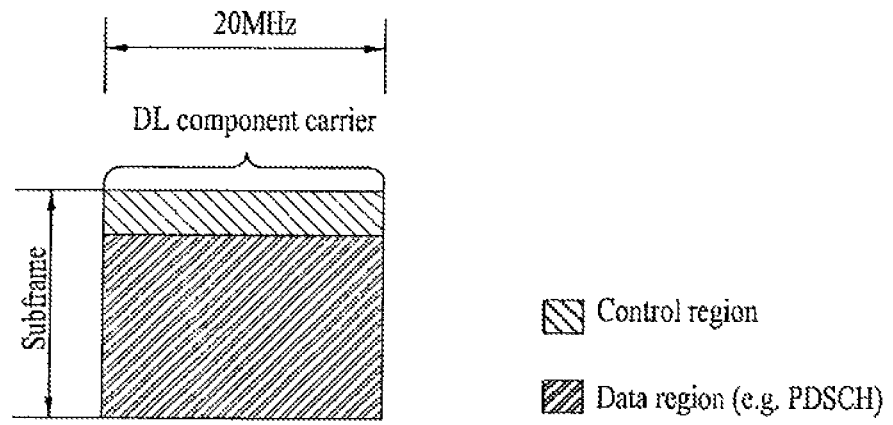
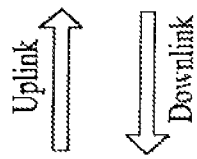
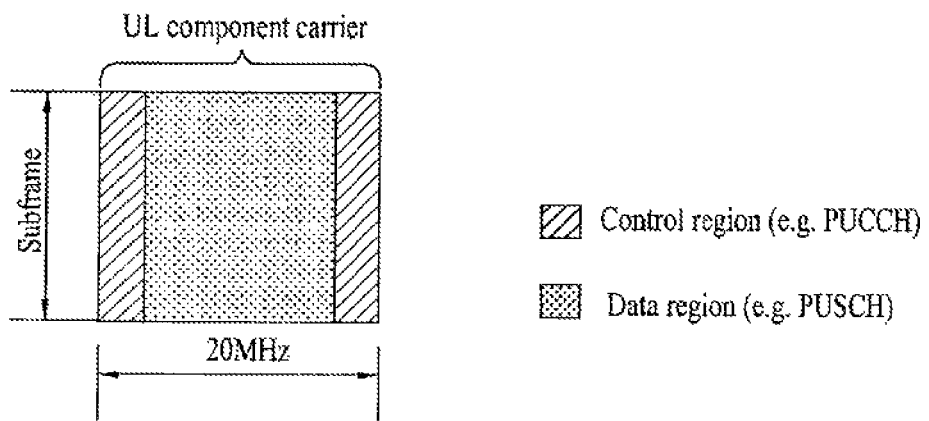
Single component carrier (e.g. LTE system)

Fig. 8
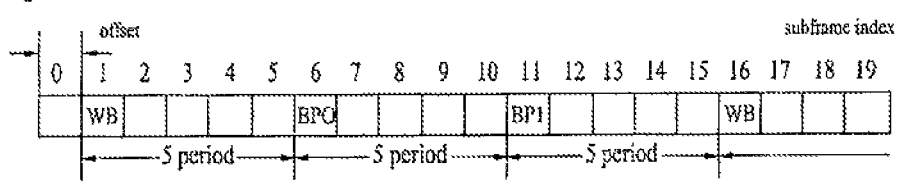
(a) Channel Quality Indicator(CQI)only
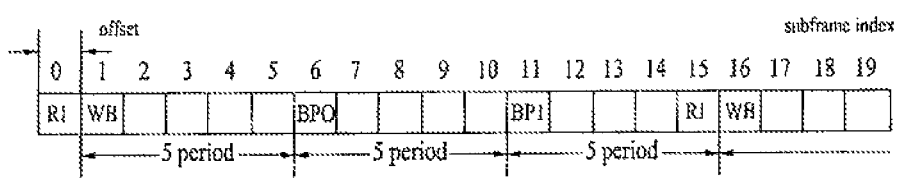
(b) CQI and Rank Indicator(RI)

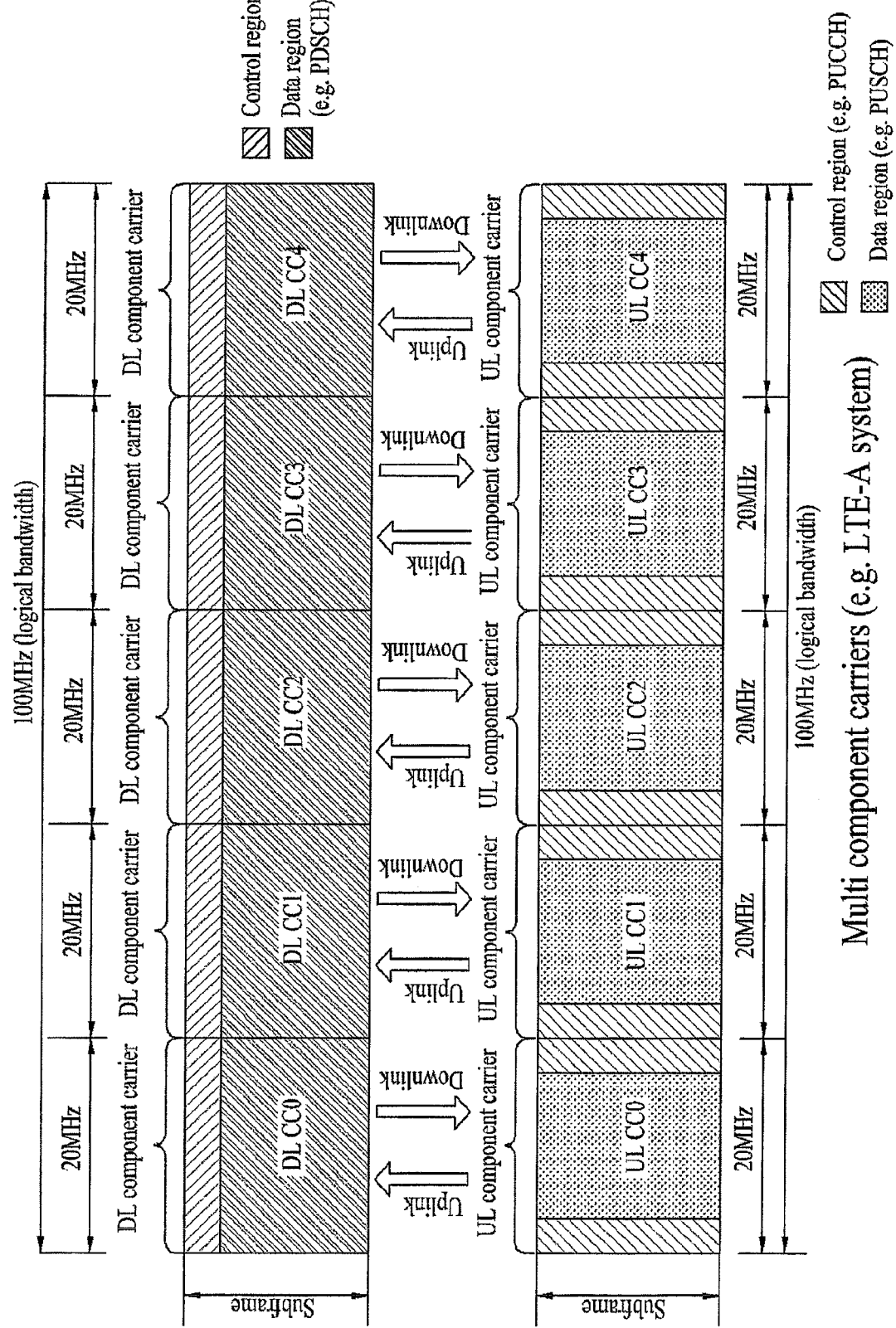

Case 1: One DL CC to one UL CC

The UL CC becomes available/activated when the linked DL CC is configured to active DL CC; and
The UL CC becomes non-available/deactivated when the linked DL CC is configured to non-active DL CC.

---

Case 2-1: Multiple DL CCs to one UL CC

The UL CC becomes available/activated when any one of the linked multiple DL CCs is configured to active DL CC; and
The UL CC becomes non-available/deactivated only when all of the linked multiple DL CCs are configured to non-active DL CC.

---

Case 2-2: One DL CC to multiple UL CCs

All UL CCs become available/activated when the linked DL CCs is configured to active DL CC; and
All UL CC become non-available/deactivated when the linked DL CC is configured to non-active DL CC.

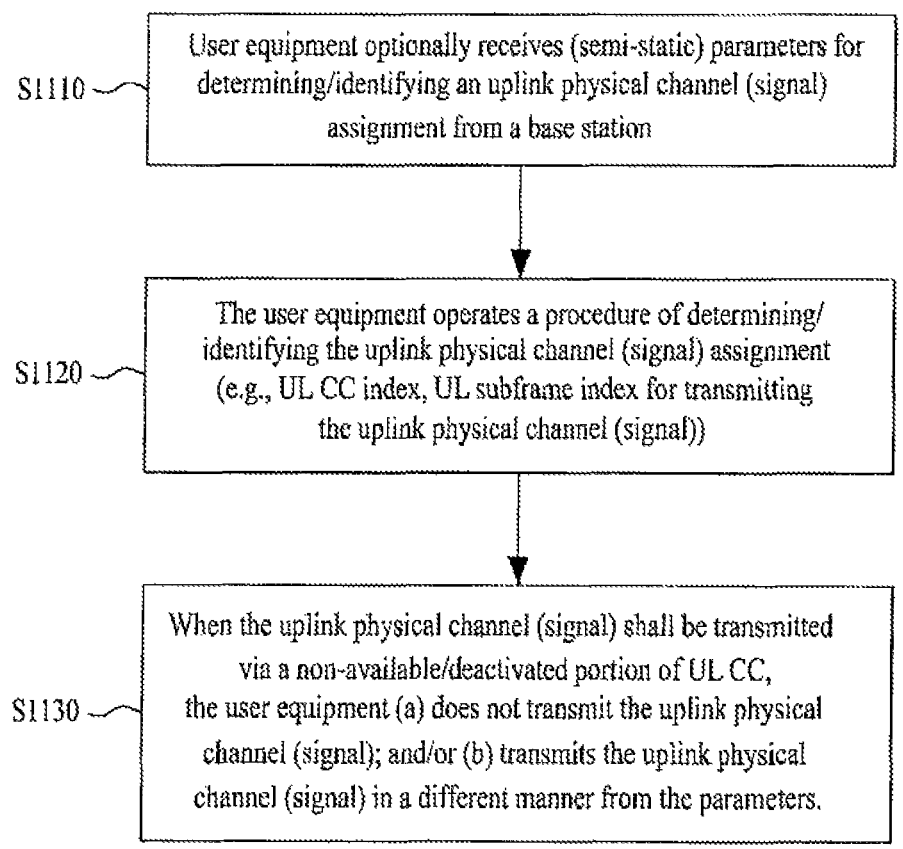

COMMUNICATION METHOD USING A CARRIER AGGREGATION AND APPARATUS THEREFORE

CROSS-REFERENCE TO RELATED APPLICATIONS

This application is continuation of co-pending U.S. patent application Ser. No. 13/619,646 filed on Sep. 14, 2012, which is a continuation of U.S. application Ser. No. 13/376,740, filed Dec. 7, 2011 (now U.S. Pat. No. 8,331,401, issued on Dec. 11, 2012), which is a National Phase of PCT/KR2010/003112 filed on May 17, 2010, which claims priority under 35 U.S.C. 119(e) to U.S. Provisional Application Nos. 61/185,185 filed on Jun. 8, 2009, 61/187,634 filed on Jun. 16, 2009 and 61/300,833 filed on Feb. 3, 2010, and under U.S.C. 119(a) to Patent Application No. 10-2010-0030753 filed in the Republic of Korea on Apr. 5, 2010. The entire contents of all of the above applications are hereby incorporated by reference.

BACKGROUND OF THE INVENTION

Field of the Invention

The present invention relates to a wireless (or radio) communication system. And, more particularly, the present invention relates to a communication method using a carrier aggregation and apparatus therefore.

Discussion of the Related Art

Wireless communication systems are being broadly developed in order to provide various types of communication services, such as voice or data services. Generally, a wireless communication system corresponds to a multiple access system that may support communication with multiple users by sharing available system resources (bandwidth, transmission power, etc.). Examples of a multiple access system include a CDMA (code division multiple access) system, an FDMA (frequency division multiple access) system, a TDMA (time division multiple access) system, an OFDMA (orthogonal frequency division multiple access) system, an SC-FDMA (single carrier frequency division multiple access) system, an MC-FDMA (multi carrier frequency division multiple access) system, and so on.

SUMMARY OF THE INVENTION

An object of the present invention devised to solve the problem lies on providing a method and apparatus for efficiently performing communication in a wireless communication system supporting carrier aggregation. Another object of the present invention devised to solve the problem lies on providing a method and apparatus for efficiently controlling multiple component carriers. A further object of the present invention devised to solve the problem lies on providing a method for efficiently transmitting uplink signals and an apparatus for the same.

The technical objectives that are to be realized by the present invention will not be limited only to the technical objects pointed out herein. Other technical objectives that have not yet been mentioned herein will become apparent to those having ordinary skill in the art upon examination of the following or may be learned from practice of the invention.

In an aspect of the present invention, a method of controlling uplink transmission at a user equipment in a wireless communication system, wherein the user equipment is connected to multiple component carriers is provided, in which the method includes receiving configuration information for transmitting an uplink signal from a base station; and identifying a time for transmitting the uplink signal to the base station on a corresponding uplink component carrier in use of the configuration information, wherein if the corresponding uplink component carrier is in a non-available state at the time for transmitting the uplink signal, the uplink signal is not transmitted on the corresponding component carrier.

In another aspect of the present invention, a user equipment configured to communicate with a base station in a wireless communication system is provided, in which the user equipment includes a radio frequency (RF) unit configured to transmit and receive wireless signals to and from the base station by using multiple component carriers; a memory configured to store information being transmitted and received to and from the base station and parameters required for performing operations of the user equipment; and a processor configured to be connected to the RF unit and the memory, and configured to control the RF unit and the memory, so as to operate the user equipment, and wherein the processor is configured to receive configuration information for transmitting an uplink signal from the base station and to identify a time for transmitting the uplink signal to the base station on a corresponding uplink component carrier in used of the configuration information, wherein if the corresponding uplink component carrier is in a non-available state at the time for transmitting the uplink signal, the uplink signal is not transmitted on the corresponding component carrier.

Herein, the configuration information may include information for periodically transmitting the uplink signal to the base station. In this case, the uplink signal may include at least one of a CQI (Channel Quality Indicator), a PMI (Precoding Matrix Indication), an RI (Rank Information), and an SRS (Sounding Reference Signal).

Herein, whether or not the corresponding uplink component carrier is in a non-available state may be identified by using a state of a downlink component carrier linked to the corresponding uplink component carrier. In this case, the corresponding uplink component carrier may be configured as a non-available state, when multiple downlink component carriers linked to the corresponding uplink component carrier are all in a non-available state. Furthermore, whether or not the corresponding uplink component carrier may be in a non-available state is identified by using L1/L2 control signaling.

In another aspect of the present invention, a method of transmitting an uplink signal from a user equipment to a base station in a wireless communication system, wherein the user equipment is connected to multiple component carriers, is provided. The method includes setting-up a first configuration for transmitting the uplink signal; identifying a time for transmitting the uplink signal in use of the first configuration; and, when the time overlaps with a non-available duration of a carrier component related to the uplink signal, transmitting the uplink signal to the base station according to a second configuration, and wherein, in the second configuration, at least one of information related to a transmission cycle period and information related to a frequency band is different from the first configuration.

In a further aspect of the present invention, a user equipment configured to communicate with a base station in a wireless communication system is provided, in which the user equipment includes a radio frequency (RF) unit configured to transmit and receive wireless signals to and from the base station by using multiple component carriers; a memory configured to store information being transmitted and received to and from the base station and parameters required for performing operations of the user equipment; and a processor configured to be connected to the RF unit and the memory, and configured to control the RF unit and the memory, so as to operate the user equipment, and wherein the processor is configured to set-up a first configuration for transmitting the uplink signal, to identify a time for transmitting the uplink signal in use of the first configuration, and to transmit the uplink signal to the base station according to a second configuration when the time overlaps with a non-available duration of a carrier component related to the uplink signal, and wherein, in the second configuration, at least one of information related to a transmission cycle period and information related to a frequency band is different from the first configuration.

According to the embodiments of the present invention, communication may be efficiently performed in a wireless communication system supporting carrier aggregation. Also, multiple component carriers may be efficiently controlled. Additionally, an uplink signal may be efficiently transmitted by using multiple component carriers. More specifically, when the states of the multiple component carriers are changed (or shifted) dynamically, a CQI or SRS may be efficiently transmitted. Furthermore, in an asymmetric carrier aggregation environment (or condition), the state of the component carriers may be efficiently configured (or set-up).

The effects that can be achieved in the present invention will not be limited only to the effects pointed out in the description of the present invention. Other effects that have not yet been mentioned herein will become apparent to those having ordinary skill in the art upon examination of the following or may be learned from practice of the invention.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 illustrates an exemplary radio (or wireless) interface protocol structure between a user equipment and an E-UTRAN based upon a 3GPP radio access network standard.

FIG. 3 illustrates an exemplary structure of a radio frame used in an LTE.

FIG. 4 illustrates an example of performing communication in a single component carrier condition.

FIG. 6 to FIG. 8 illustrate examples of periodically transmitting uplink signals.

FIG. 9 illustrates an example of performing communication under a multiple component carrier condition.

FIG. 10 illustrates an example of setting up a component carrier condition according to an embodiment of the present invention.

FIG. 11 to FIG. 17 illustrate examples of transmitting uplink signals according to an embodiment of the present invention.

DETAILED DESCRIPTION OF THE INVENTION

The structure, application, and other characteristics of the present invention may be understood by the foregoing general description and the following detailed description of the embodiments of the present invention with reference to the following drawings. Herein, the embodiments of the present invention may be applied in diverse wireless (or radio) access technologies, such as CDMA, FDMA, TDMA, OFDMA, SC-FDMA, and MC-FDMA. The CDMA may be embodied with wireless technology such as UTRA (Universal Terrestrial Radio Access) or CDMA2000. The TDMA may be embodied with wireless technology such as GSM (Global System for Mobile communications)/GPRS (General Packet Radio Service)/EDGE (Enhanced Data Rates for GSM Evolution). The OFDMA may be embodied with wireless technology such as IEEE 802.11 (Wi-Fi), IEEE 802.16 (WiMAX), IEEE 802.20, and E-UTRA (Evolved UTRA). The UTRA is a part of the UMTS (Universal Mobile Telecommunications System). The 3GPP (3rd Generation Partnership Project) LTE (long term evolution) is a part of the E-UMTS (Evolved UMTS), which uses E-UTRA. The LTE-A (Advanced) is an evolved version of the 3GPP LTE.

The following embodiments of the present invention mainly describe examples of the technical characteristics of the present invention being applied to the 3GPP system. However, this is merely exemplary. Therefore, the present invention will not be limited only to the embodiments of the present invention described herein.

Figure 1:
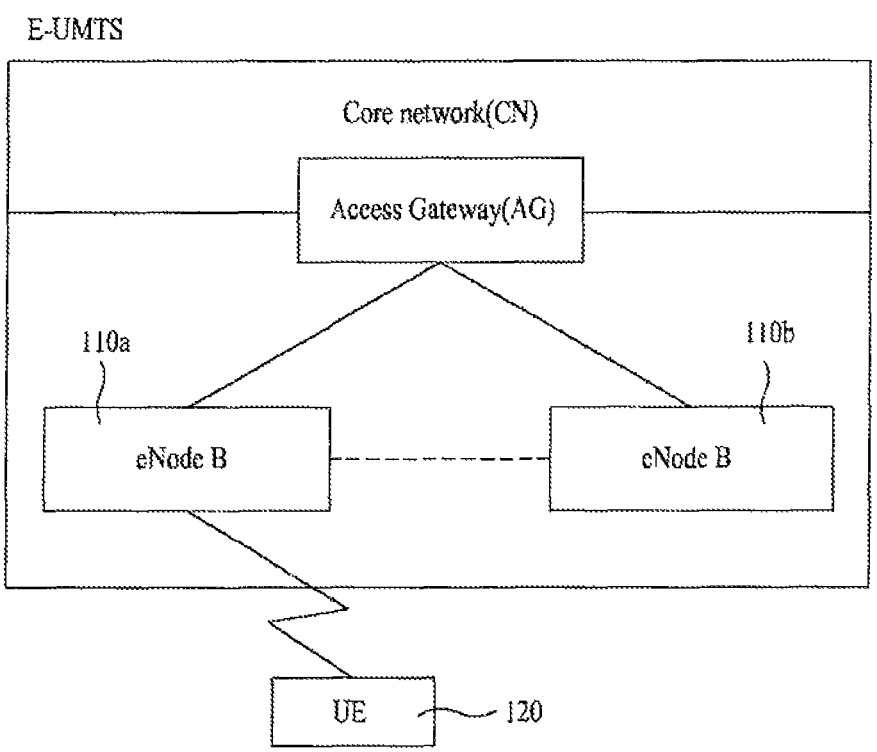
FIG. 1 illustrates a network structure of an E-UTMS (Evolved Universal Mobile Telecommunications System).

FIG. 1 is a diagram illustrating a network structure of an Evolved Universal Mobile Telecommunications System (E-UMTS). The E-UMTS may also be referred to as a Long Term Evolution (LTE) system. For details of the technical specifications of the UMTS and the E-UMTS, refer to Release 7 and Release 8 of "3rd Generation Partnership Project; Technical Specification Group Radio Access Network".

Referring to FIG. 1, the E-UMTS includes a User Equipment (UE) (120), base stations (eNode B or eNB) (110a and 110b), and an Access Gateway (AG) which is located at an end of a network (E-UTRAN) and connected to an external network. The base stations can simultaneously transmit multiple data streams for a broadcast service, a multicast service and/or a unicast service. One or more cells may exist for one base station. One cell is set to one of bandwidths of 1.25, 2.5, 5, 10, and 20 Mhz. Different cells may be set to provide different bandwidths. Also, one base station controls data transmission and reception for a plurality of user equipments. The base station transmits downlink (DL) scheduling information of downlink data to the corresponding user equipment to notify information related to time and frequency regions to which data will be transmitted, encoding, data size, and HARQ (Hybrid Automatic Repeat and reQuest). Also, the base station transmits uplink (UL) scheduling information of uplink data to the corresponding user equipment to notify information related to time and frequency domains that can be used by the corresponding user equipment, encoding, data size, and HARQ. An interface for transmitting user traffic or control traffic can be used between the base stations. A Core Network (CN) may include the AG and a network node or the like for user registration of the UE. The AG manages mobility of a UE on a TA (Tracking Area) basis, wherein one TA includes a plurality of cells.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used in the user equipment and the network to manage call. The user plane means a passageway where data generated in an application layer, for example, voice data or Internet packet data, are transmitted.

A physical layer as a first layer provides an information transfer service to an upper layer using a physical channel. The physical layer is connected to a medium access control layer above the physical layer via a transport channel. Data are transferred between the medium access control layer and the physical layer via the transport channel. Data are transferred between one physical layer of a transmitting side and the other physical layer of a receiving side via the physical channel. The physical channel uses time and frequency as radio resources. Specifically, the physical channel is modulated in accordance with an OFDMA (Orthogonal Frequency Division Multiple Access) scheme in a downlink, and is modulated in accordance with a SC-FDMA (Single Carrier Frequency Division Multiple Access) scheme in an uplink.

A medium access control layer of a second layer provides a service to a radio link control (RLC) layer above the MAC layer via a logical channel. The RLC layer of the second layer supports reliable data transfer. The RLC layer may be implemented as a functional block inside the MAC layer. In order to effectively transmit IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on a lowest part of a third layer is defined in the control plane only. The RRC layer is associated with configuration, reconfiguration and release of radio bearers (RBs) to be in charge of controlling the logical, transport and physical channels. In this case, the RB means a service provided by the second layer for the data transfer between the user equipment and the network. To this end, the RRC layers of the user equipment and the network exchange RRC messages with each other. If the RRC layer of the user equipment is RRC connected with the RRC layer of the network, the user equipment is in RRC connected mode. If not so, the user equipment is in RRC idle mode. A NAS (Non-Access Stratum) layer located above the RRC layer performs functions such as session management and mobility management.

As downlink transport channels carrying data from the network to the user equipment, there are provided a BCH (Broadcast Channel) carrying system information, a PCH (Paging Channel) carrying paging message, and a downlink SCH (Shared Channel) carrying user traffic or control messages. Traffic or control messages of a downlink multicast or broadcast service may be transmitted via the downlink SCH or an additional downlink MCH (Multicast Channel). Meanwhile, as uplink transport channels carrying data from the user equipment to the network, there are provided a RACH (Random Access Channel) carrying an initial control message and an uplink SCH (Shared Channel) carrying user traffic or control message. As logical channels located above the transport channels and mapped with the transport channels, there are provided a BCCH (Broadcast Control Channel), a PCCH (Paging Control Channel), a CCCH (Common Control Channel), a MCCH (Multicast Control Channel), and a MTCH (Multicast Traffic Channel).

FIG. 3 is a diagram illustrating a structure of a radio frame used in the LTE system.

Referring to FIG. 3, the radio frame has a length of 10 ms (327200×Ts) and includes 10 subframes of an equal size. Each subframe has a length of 1 ms and includes two slots. Each slot has a length of 0.5 ms (15360×Ts). In this case, Ts represents a sampling time, and is expressed by $T_s=1/(15 \text{ kHz} \times 2048)=3.2552\times10^{-8}$ (about 33 ns). The slot includes a plurality of OFDM symbols in a time domain, and includes a plurality of resource blocks (RBs) in a frequency domain. In the LTE system, one resource block includes twelve (12) subcarriers×seven (or six) OFDM symbols. A Transmission Time Interval (TTI) which is a transmission unit time of data can be determined in a unit of one or more subframes. The aforementioned structure of the radio frame is only exemplary, and various modifications can be made in the number of subframes included in the radio frame or the number of slots included in the subframe, or the number of OFDM symbols included in the slot.

FIG. 4 illustrates an example of a communication process being performed in a single component carrier wave condition. FIG. 4 may correspond to an example of a communication process in an LTE system.

Referring to FIG. 4, a general FDD-type wireless communication system performs signal (e.g., data, control information) transmission and/or reception through one downlink band and one uplink band corresponding to the downlink band. The base station and user equipment transmits and/or receives data and/or control information scheduled in subframe units. Herein, the data are transmitted and/or received through a data region determined in the up-/downlink subframe, and the control information is transmitted and/or received through a control region determined in the up-/downlink subframe. For this, the up-/downlink subframe delivers signals through a plurality of physical channels. FIG. 4 mainly describes the FDD mode for simplicity. However, the above-described detail may also be applied in the TDD mode, by differentiating the wireless (or radio) of FIG. 3 into up-/downlink portions in the time domain.

In a downlink, the control region starts from a first OFDMA symbol of a subframe and includes at least one or more OFDMA symbols. The size of the control region may be independently configured (or determined) for each subframe. The control region is used for transmitting L1/L2 (layer 1/layer 2) control signals. The data region is used for transmitting downlink traffic. Control channels being assigned to the control region include PCFICH (Physical Control Format Indicator CHannel), PHICH (Physical Hybrid-ARQ Indicator CHannel), and PDCCH (Physical Downlink Control CHannel).

The PDCCH is assigned to the first n number of OFDM symbols of a subframe. Herein, n is an integer more than or equal to 1, which is indicated by PCFICH. The PDCCH is configured of one or more CCEs. Each CCE includes 9 REGs, and each REG consists of 4 resource elements adjacent to one another while excluding a reference signal. A resource element corresponds to a minimum resource unit defined as 1 subcarrier×1 symbol. The PDCCH notifies information on resource assignment (or allocation) of transmitting channels PCH (Paging channel) and DL-SCH (Downlink-shared channel), Uplink Scheduling Grant, HARQ information, and so on to each user equipment (or user terminal) or user equipment group. The PCH (Paging channel) and the DL-SCH (Downlink-shared channel) are transmitted through the PDSCH. Information on which user equipment (one or a plurality of user equipments) data of the PDSCH are to be transmitted, and information on how the user equipments are to receive and decode the PDSCH data are included in the PDCCH, thereby being transmitted. For example, it is assumed that a specific PDCCH is CRC masked with an RNTI (Radio Network Temporary Identity) "A", and that information on the data being transmitted by using a radio (or wireless) resource (e.g., frequency position) "B" and a transmission format information (e.g., transmission block size, modulation method, coding information, and so on) "C" is transmitted through a specific subframe. A user equipment of the corresponding cell uses its own RNTI information to monitor the PDCCH, and a user equipment having the RNTI "A" receives the PDCCH. Then, by using the information on the received PDCCH, the PDSCH indicated by "B" and "C" is received.

Figure 5:
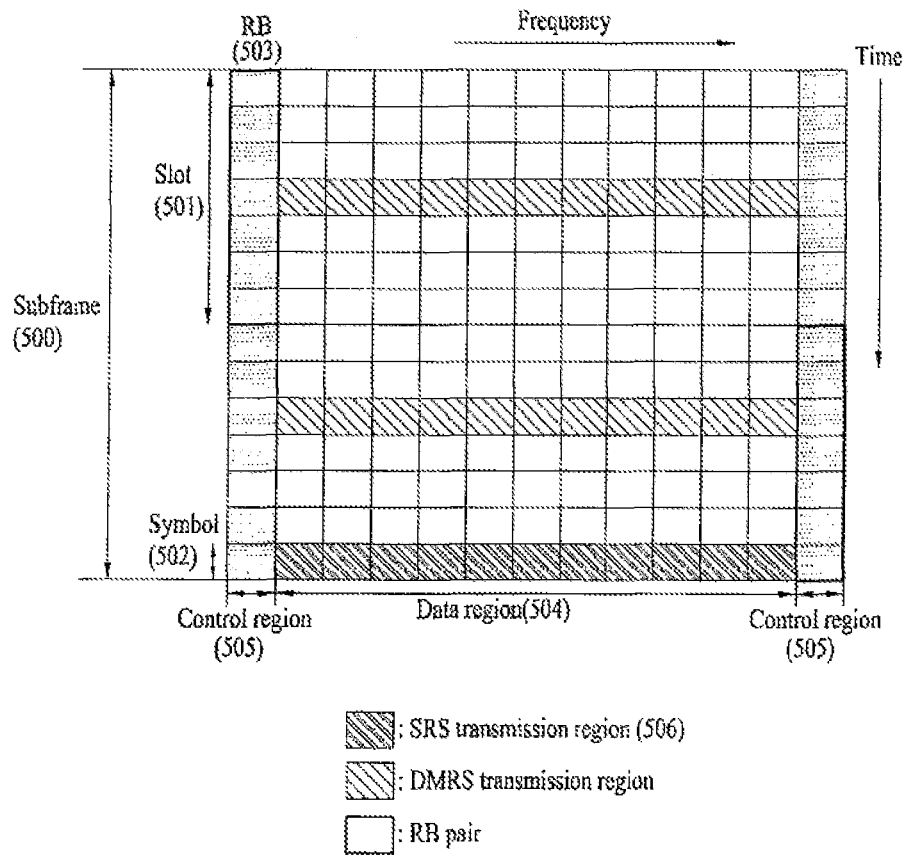
FIG. 5 illustrates an exemplary structure of an uplink subframe used in the LTE.

FIG. 5 illustrates an exemplary structure of an uplink subframe used in the LTE.

Referring to FIG. 5, a subframe (500) having the length of 1 ms, which is a basic unit for uplink transmission, is configured of two 0.5 ms slots (501). When the length of a normal Cyclic Prefix (CP) is assumed to be used, each slot is configured of 7 symbols (502), and each symbol corresponds to one SC-FDMA symbol. A Resource Block (RB) (503) is a resource assignment (or allocation) unit corresponding to 12 carriers in the frequency region and one slot in the time region. The uplink subframe is divided into a data region (504) and a control region (505).

The data regions includes an uplink shared channel (PUSCH) and is used for transmitting data signals, such as voice (or sound), image, and so on. The control region includes an uplink control channel (PUCCH) and is used for transmitting control information. The PUCCH includes an RB pair located at each end of the data region in a frequency axis and hops at a slot boundary. The control information includes HARQ ACK/NACK and channel information on the downlink (hereinafter referred to as downlink channel information or channel information). The downlink channel information includes CQI (Channel Quality Indicator), PMI (Precoding Matrix Indication), RI (Rank information), and so on. The base station uses the downlink channel information received from each user equipment, so as to decide time/frequency source, modulation methods, coding rates, and so on appropriate for transmitting data to each user equipment.

In the LTE system, depending upon the channel information transmission mode, each user equipment may transmit all or only a portion of the CQI, PMI, RI, and so on. A case where the channel information is periodically transmitted is referred to as periodic reporting, and a case where the channel information is transmitted only upon request from the base station is referred to as aperiodic reporting. In case of the aperiodic reporting, a request bit, which is included in the uplink scheduling information sent from the base station, is transmitted to the user equipment. Thereafter, the user equipment delivers channel information, wherein its own transmission mode is taken into consideration, to the base station through an uplink data channel (PUSCH). In case of the periodic reporting, a cycle period and an offset in the corresponding cycle period are signaled in subframe units to each user equipment in a semi-static manner through an upper layer signaling. Each user equipment delivers channel information considering its respective transmission mode to the base station through the uplink control channel (PUCCH) based upon a pre-decided cycle period. If uplink data coexist in the subframe transmitting the channel information, the channel information is transmitted through the uplink data channel (PUSCH) along with the data. The base station transmits transmission timing information appropriate for each user equipment, while taking into consideration the channel condition of each user equipment and a user equipment dispersion (or distribution) status within a cell. The transmission timing information includes a cycle period for transmitting channel information, and an offset. And, the transmission timing information may be delivered to each user equipment through an RRC message.

Meanwhile, the user equipment (or terminal) transmits a Sounding Reference Signal (SRS) in order to notify the base station of uplink channel information. In the LTE, the SRS is transmitted through a duration including an SC-FDMA symbol, which is located at the very end of an uplink subframe in the time axis, and through a data transmission band in the frequency axis. The SRS of multiple user equipments being transmitted to the last SC-FMDA of the same uplink subframe may be differentiated by the frequency position/sequence. For each user equipment, a cycle period for transmitting an SRS and an offset of the corresponding cycle period may be signaled in subframe units through an upper-layer signaling in a semi-static manner. Depending upon its configurations (or settings), the SRS may be transmitted through entire band or a subband. And, in case the SRS is transmitted through a subband, a frequency band hopping may be performed when transmitting the SRS.

Configuration information (e.g., cycle period, offset, transmission band, whether or not hopping is performed, etc.) for transmitting the channel information on the downlink or the SRS may be assigned to the user equipment from the base station via Cell-specific and/or UE-specific RRC signaling.

Figure 6:
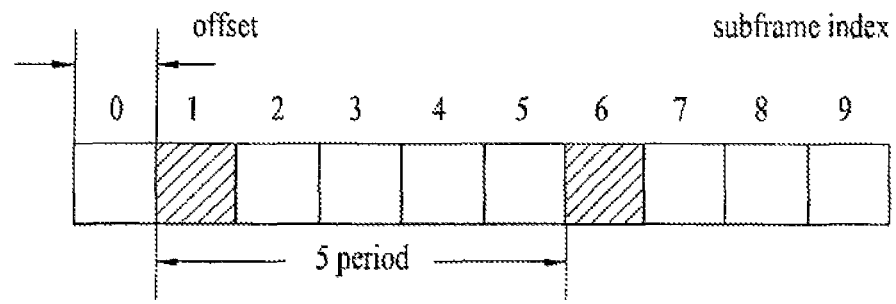
Figure 7:
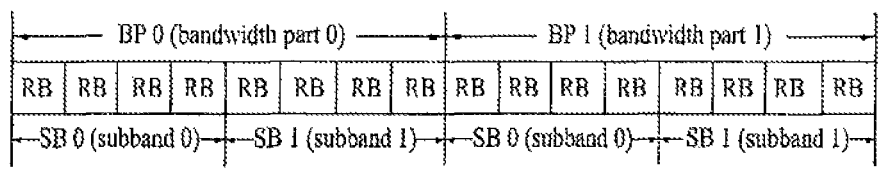

FIG. 6 to FIG. 8 illustrate examples of periodic reporting of channel information. Although the following drawings are mostly based upon the case of transmitting downlink channel information (e.g., CQI, PMI, RI, etc.) for simplicity, the examples may also be applied to the case of transmitting uplink channel information (e.g., SRS, etc.).

FIG. 6 illustrates an example of transmitting channel information when the user equipment is signaled with an information indicating {period '5', offset '1'}. Referring to FIG. 6, when receiving information indicating that the cycle period is '5' and that the offset is '2' the user equipment transmits channel information in five (5) subframe units starting from a 0th subframe in an increasing direction of the subframe index with the offset of one (1) subframe. The channel information is essentially transmitted through the PUCCH. However, if a PUSCH exists, wherein the PUSCH is used for transmitting data at the same time as the PUCCH, the channel information is transmitted through the PUSCH along with the data. The subframe index is configured of a combination of a system frame number ($n_f$) and a slot index ($n_s$, 0~19). Since the subframe consists of two (2) slots, the subframe index may be defined as $10 \times n_f + \text{floor}(n_s/2)$. Herein, the floor ( ) indicates a floor function.

FIG. 7 illustrates an example of a system having a system band configured of sixteen (16) RBs. In this case, it is assumed that the system band consists of two (2) BPs (Bandwidth Parts), that each BP is configured of two (2) SBs (subbands) (SB0, SB1), and that each SB consists of four (4) RBs. The above-mentioned assumption is merely exemplary, and, therefore, depending upon the size of the system band, the number of BPs and the size of the SBs may vary. Also, depending upon the number of RBs, the number of BPs, and the size of the SBs, the number of SBs configuring each BP may also vary. In case of the type transmitting both WB CQI and SB CQI, the WB CQI and the SB CQI are alternately transmitted. Meanwhile, in case of the type transmitting also the PMI depending upon the PMI feedback type, the PMI information is transmitted along with the CQI information.

FIG. 8 illustrates an example of transmitting both WB CQI and SB CQI when the user equipment is signaled with an information indicating {period '5', offset '1'}. Referring to FIG. 8, regardless of its type, the CQI may only be transmitted in a subframe corresponding to the signaled cycle period and offset. FIG. 8(a) illustrates an example wherein only the CQI is transmitted, and FIG. 8(b) illustrates an example wherein the CQI is transmitted along with the RI. The RI, which consists of a combination of the multiple of WB CQI transmission cycle period by which the RI is being transmitted and an offset of the corresponding cycle period, may be signaled from an upper layer (e.g., RRC layer). For example, if the CQI offset is '1', and if the RI offset is '0', the RI has the same offset as the CQI. The offset value of the RI is defined as 0 and a negative number. More specifically, it is assumed that in FIG. 8(b), in an environment identical to that of FIG. 8(a), the RI transmission cycle period is a one (1) time multiple of the WB CQI transmission cycle period, and that the RI offset is '−1'. In case the transmission subframe of the WB CQI and the RI overlap, the WB CQI is dropped, and the RI is transmitted.

FIG. 9 illustrates an example of performing communication under a multiple component carrier situation. Herein, in order to use a broader (or wider) frequency band, the LTE-A system uses a carrier aggregation (or bandwidth aggregation) technology, which gathers multiple up-downlink frequency blocks so as to use a larger up-/downlink bandwidth. Each frequency block is transmitted by using a component carrier (CC). In the description of the present invention, depending upon the context, the component carrier (CC) may refer to a frequency block for carrier aggregation or a center carrier of the frequency block, and such definitions may be alternately used herein.

Referring to FIG. 9, five (5) 20 MHz CCs may be gathered in each of the uplink and downlink, so as to support a 100 MHz bandwidth. Each of the CCs may be adjacent or non-adjacent to one another in the frequency domain. For simplicity, FIG. 9 illustrates a case where the bandwidth of an uplink component carrier and the bandwidth of a downlink component carrier are both identical and symmetrical to one another. However, the bandwidth of each component carrier may be independently decided. For example, the bandwidth of the uplink component carrier may be configured as 5 MHz (UL CC0)+20 MHz (UL CC1)+20 MHz (UL CC2)+20 MHz (UL CC3)+5 MHz (UL CC4). Also, an asymmetrical carrier aggregation, Wherein the number of uplink component carriers and the number of downlink component carriers are different from one another, may also be performed. The asymmetrical carrier aggregation may be caused by a limit in available frequency bands or artificially created by network settings. For example, even if the overall system band is configured of N number of CCs, the frequency band that can be received by one specific user equipment may be limited to M(<N) number of CCs. Hereinafter, the embodiments of the present invention are mostly described with respect to the case where N number of CCs is applied, for simplicity. However, it is also apparent that the embodiments may be applied to a case where M number of CCs is applied. Furthermore, the N (or M) number of CCs assigned to the user equipment is divided into L number of CC groups, and the embodiments of the present invention may also be applied to each CC group.

Embodiment 1

Status Configurations (or Settings) of a Component Carrier

When the user equipment accesses (or is connected to) a cell configured of multiple DL CCs, in order to reduce battery power consumption of the user equipment, the base station limits a general (or normal) control/data reception to only one DL CC or some DL CCs among the total DL CCs of the system. As for the remaining DL CCs, the base station may assign (or allocate) DL CCs so that the reception can be limited. For simplicity, DL CC(s) assigned (or allocated) so that the general (or normal) control/data reception can be performed with respect to a certain user equipment is/are defined as active DL CC(s). And, the remaining DL CC(s) is/are defined as non-active DL CC(s). For example, a base station controlling a cell configured of 5 DL CCs, as shown in FIG. 9, may assign only one DL CC to a certain user equipment as the active DL CC and may assign the remaining 4 DL CCs as the non-active DL CCs. Herein, the active/non-active DL CCs may be assigned semi-statically or dynamically. And, in order to do so, RRC signaling, L1/L2 control signaling (e.g., PDCCH), or a separately defined signaling may be used. The active/non-active DL CCs may be assigned by using a channel condition (or status), required amount of downlink traffic, downlink traffic, or any combination of the above. In the description of the present invention, unless the active/non-active DL CCs are specifically differentiated by definition and described accordingly, active/non-active DL CCs may be used along with its equivalent terms, such as available/non-available DL CCs or activated/deactivated DL CCs.

As shown in FIG. 9, when multiple DL CCs and UL CCs exist, the base station may configure (or set-up) a semi-static or dynamic linkage between a specific UL CC and a specific DL CC, so as to signal the user equipment. The linkage relation between the DL CC and the UL CC may be configured (or set-up) by Cell-specific or UE-specific RRC signaling or L1/L2 control signaling (e.g., PDCCH). In this case, in order to perform reduction in signaling overhead, the present invention proposes a method of automatically configuring (or setting-up) the state of the UL CC in synchronization with the state of the DL CC linked with the UL CC. More specifically, when a specific DL CC is assigned as an active DL CC, the UL CC linked with the corresponding DL CC is automatically configured to be able to perform transmission of an uplink signal. For simplicity, such UL CC may be referred to as an available UL CC, and it can be said that the corresponding UL CC is in an available state. Conversely, when a specific DL CC is assigned as a non-active DL CC, the UL CC linked to the corresponding DL CC is automatically configured not to perform transmission of all or some uplink signals. For simplicity, such UL CC may be referred to as a non-available UL CC, and it can be said that the corresponding UL CC is in a non-available state. In the description of the present invention, unless the available/non-available UL CCs are specifically differentiated by definition and described accordingly, available/non-available UL CCs may be used along with its equivalent terms, such as active/non-active UL CCs or activated/deactivated UL CCs.

Since the DL CC may be semi-statically or dynamically configured (or set-up) as and changed as active/non-active DL CCs, the UL CC linked to the corresponding DL CC is also automatically semi-statically or dynamically configured as an available/non-available UL CC. In other words, the UL CC may be semi-statically or dynamically shifted to an available/non-available state depending upon the state of the DL CC within the time axis. At this point, the available/non-available UL CC configurations (or settings) of the UL CC in accordance with the active/non-active DL CC assignment of the DL CC may not necessarily exist at the same timing, and, accordingly, there may exist a predetermined timing interval.

FIG. 10 illustrates an example of configuring (or setting) a UL CC state depending upon a mapping (i.e., linkage) relation between the UL CC and the DL CC. Case 1 shows an example wherein the DL CC and the UL CC are mapped in a one-to-one (one DL CC to one UL CC) correspondence. Case 2 shows as example wherein the DL CC and the UL CC are mapped in a multiple-to-one (multiple DL CCs to one UL CC) correspondence. And, Case 3 shows an example wherein the DL CC and the UL CC are mapped in a one-to-multiple (one DL CC to multiple UL CCs) correspondence. The asymmetrical mapping examples, such as Case 2 and Case 3, may occur in an asymmetrical carrier aggregation environment.

Referring to Case 1, when a linked DL CC is assigned as an active DL CC, the UL CC is automatically configured (or set-up) as an available UL CC, and when a linked DL CC is assigned as a non-active DL CC, the UL CC is automatically configured (or set-up) as a non-available UL CC. Referring to Case 2, among the DL CCs linked to the UL CC, even when only one DL CC is assigned as an active DL CC, the UL CC may be automatically configured as an available UL CC. Meanwhile, only when all DL CCs linked to the UL CC are assigned as non-active DL CCs, the corresponding UL CC may be configured as a non-available UL CC. Referring to Case 3, when one DL CC is assigned as an active DL CC, all linked UL CCs are configured as available UL CCs. And, when the corresponding DL CC is assigned as a non-active DL CC, then all linked UL CCs may be configured as non-available UL CCs.

Embodiment 2

Control of Uplink Transmission in a Carrier Aggregation Condition

In a conventional 3GPP system, the uplink transmission time of some of the uplink signals is decided based upon a predetermined configuration/timing. For example, when receiving downlink data, an ACK/NACK signal respective to the downlink data is automatically transmitted after a predetermined time has elapsed from the downlink data reception point. Also, the user equipment periodically reports channel information on downlink (e.g., CQI, PMI, RI, etc.) to the base station, and the user equipment also periodically transmits uplink signals (e.g., SRS) so that the base station can measure the channel status of the uplink. In order to facilitate the understanding of the present invention, hereinafter description will be made by using uplink signals associated with the downlink, or preferably, by using CQI as a main example of downlink channel information, and by using SRS a main example of a signal associated with uplink. Configuration information for transmitting CQI, SRS, and so on (e.g., cycle period, offset, transmission band, whether or not hopping is performed, etc.) may be signaled via Cell-specific and/or UE-specific RRC signaling.

When a cell is configured of multiple UL CCs, the user equipment should transmit SRS for uplink channel status measurement of the multiple UL CCs to the base station, and the user equipment should also transmit CQI information for each DL CC. In case of the CQI (or SRS), a transmission cycle is given by RRC signaling, and once such signaling is performed, transmission should be performed in accordance with the signaled transmission cycle during a predetermined period (e.g., until the settings are changed or cancelled). Meanwhile, in a carrier aggregation condition, a DL CC may be statically or semi-statically assigned as an active/non-active DL CC, and, a UL CC may be automatically configured as an available/non-available UL CC depending upon a state of a linked DL CC as explained in Embodiment 1. Unlike the Embodiment 1, a UL CC may be independently configured as an available/non-available UL CC, by using RRC signaling, L1/L2 control signaling (e.g., PDCCH), or a separately defined signaling, without relying on the state of a DL CC linked to the UL CC.

Therefore, when the corresponding DL/UL CC is configured to be in a non-active (non-available) state at the time when an uplink signal (e.g., CQI, SRS, etc.) is to be transmitted in accordance with the configuration information, since the operation for transmitting the uplink signal and the operation according to the definition of the non-active (non-available) DL/UL may be the opposite of one another, a method for resolving such problem is required. For example, when the corresponding UL CC is configured to be in a non-available state at a CQI (or SRS) transmission time, a method of giving priority to the CQI (or SRS) transmission and configuring the non-available UL CC to an available UL CC in accordance with the CQI (or SRS) transmission cycle may be considered. However, in order to configure the corresponding UL CC as an available UL CC, the DL CC linked to the corresponding UL CC should be assigned as an active DL CC. Therefore, a reduction in battery power consumption through non-active DL CC configurations cannot be largely obtained.

Accordingly, when the corresponding DL/UL CC is in a non-active (non-available) state at the time when uplink signal should be transmitted in accordance the configuration information, the present invention proposes to change the configuration (e.g., transmission time/pattern/band) for transmitting uplink signals so as to perform limited transmission, or not to transmit uplink signals.

FIG. 11 shows an example of the user equipment controlling the uplink signal transmission in a carrier aggregation condition according to an embodiment of the present invention. Referring to FIG. 11, in order to transmit an uplink signal, the user equipment may (semi-statically) receive a parameter for deciding/identifying an uplink physical channel (signal) assignment from the base station (S1110, option). The uplink signal includes a signal, e.g., CQI, PMI, RI, SRS, etc., being periodically transmitted. The parameter being received from the base station includes cycle period information, offset information, band, and so on, for transmitting the uplink signal. Thereafter, the user equipment performs a procedure for deciding/identifying the uplink physical channel (signal) assignment (S1120). Through this procedure, a UL CC index, an uplink transmission time (e.g., UL subframe index), and so on for transmitting the uplink physical channel (signal) may be decided.

Thereafter, in case the uplink physical channel (signal) is to be transmitted via the non-available duration (or portion) of the UL CC (e.g., subframe slot, OFDM or SC-FDMA symbol), the user equipment may not transmit the uplink physical channel (signal) (S1130, option (a)). More specifically, a user equipment, which is assigned with a transmission cycle period of the CQI (or SRS) for each CC via RRC signaling, transmits the CQI (or SRS), only when the transmission cycle period of the CQI (or SRS) matches the time when the corresponding UL CC is configured as an available UL CC. And, even though the cycle period correspond to the cycle period of the CQI (or SRS), when the corresponding UL CC failed to be assigned as an available UL CC, i.e., when the corresponding UL CC is assigned as a non-available UL CC, the user equipment does not transmit the CQI (or SRS). In another method, the user equipment may transmit the uplink physical channel (signal) by using a method other than the initial configuration (parameter) (e.g., changing the cycle period, changing the pattern) (S1130, option (b)). A detailed description will be given on option (a) and option (b) and a detailed description on the varied methods depending upon each condition will also be given with reference to FIGS. 12-15 and FIGS. 16-17, respectively.

Embodiment 2-1

Control of an Uplink Transmission Considering the State of the UL CC

Figure 12:
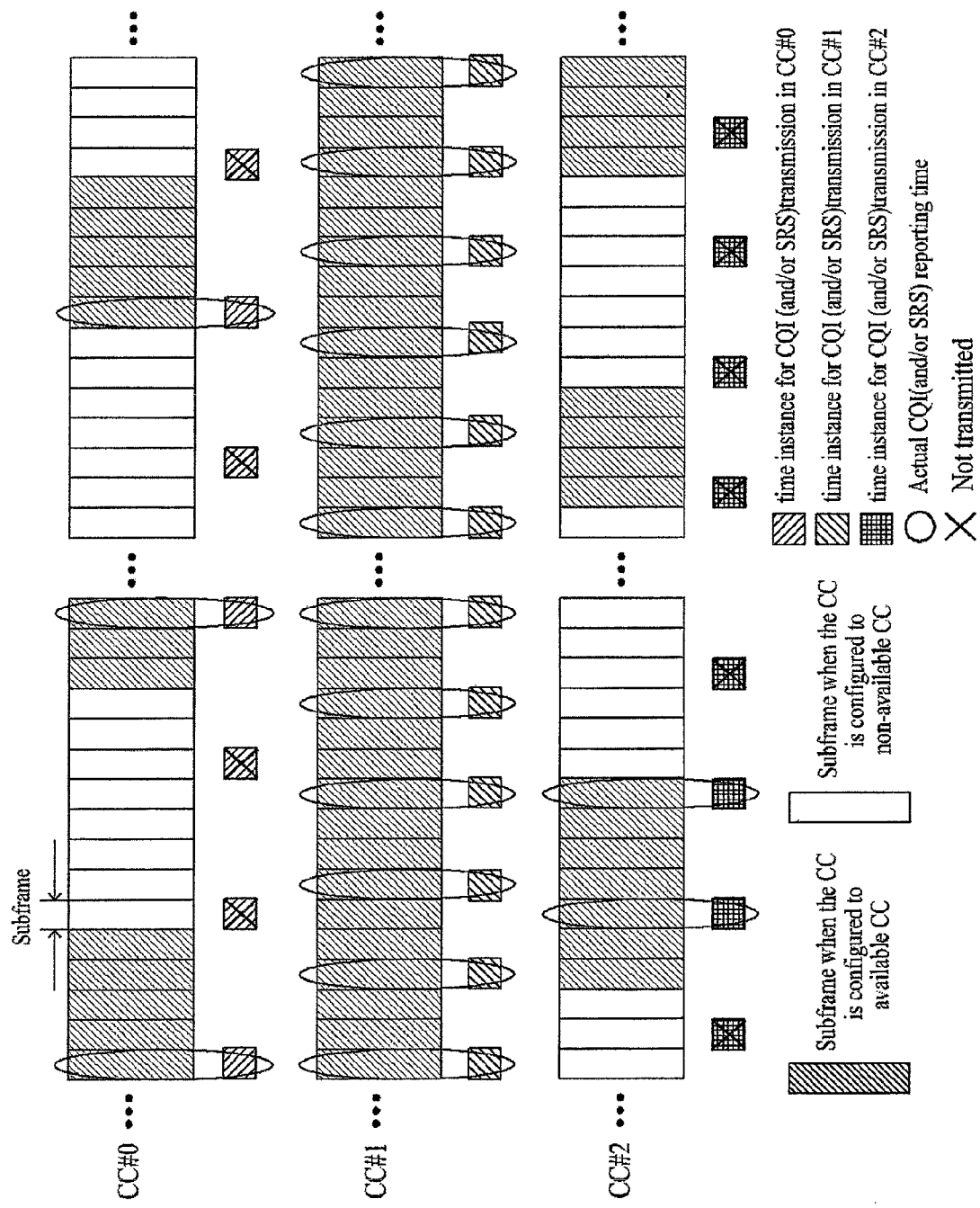

FIG. 12 shows an example of controlling the uplink transmission in consideration of the state of the UL CC. It is assumed in FIG. 12 that a cell is configured of 3 CCs. In the drawing, although the CC may be interpreted as DL CC or UL CC, in the following description, the CC is assumed to be a UL CC. In this embodiment of the present invention, with respect to a user equipment, in case of CC#1, the UL CC is always configured as an available UL CC. And, in case of CC#0 and CC#2, it is assumed that the UL CC is dynamically configured as an available/man-available UL CC depending upon the channel state and cell traffic load condition. Herein, it is assumed that 5, 3, and 4 subframes are respectively assigned as the transmission cycle period of the CQI (or SRS) for CC#1, CC#2, and CC#3.

Referring to FIG. 12, since CC#1 is always configured as the available UL CC, in CC#1, the CQI (or SRS) is always transmitted for each set of 3 subframes in accordance with the predetermined transmission cycle period. Conversely, since CC#0 and CC#2 are dynamically configured as available/non-available UL CCs, the CQI (or SRS) is transmitted only when the corresponding CC# at a reserved transmission time (e.g., subframe) is assigned as an available UL CC in accordance with the transmission cycle period. And, in other case, the CQI (or SRS) is not transmitted. In particular, a user equipment performs of determining physical uplink channel assignment for a transmission of the CQI (or SRS) at a subframe on which the CQI (or SRS) shall be transmitted, in which the CQI (or SRS) is configured not to be transmitted when a corresponding UL CC is in a state of non-available UL CC. That is, when the corresponding UL CC in a state of non-available UL CC, the user equipment may not assign a physical channel to the CQI (or SRS) at the corresponding subframe. The procedure of determining physical channel assignment includes assigning uplink signals (e.g., the CQI (or SRS)) to a PUSCH or a PUCCH. FIG. 12 merely corresponds to one of the many examples for describing the present invention. And, this example may be applied to the present invention regardless of the number of CCs, reporting cycle period, and so on. Also, the present invention may also be applied in cases for transmitting periodic or aperiodic signals other than the CQI (or SRS).

Meanwhile, when a specific CC is continuously configured as the non-available UL CC, the CQI or SRS for the corresponding CC is also continuously unavailable for transmission. However, in light of the base station, the channel information reception and channel condition for the corresponding CC are required to be measured. Therefore, in this case, a method wherein the base station assigns the DL CC linked to the corresponding UL CC as an active DL CC, so that the corresponding CC can be configured as an available UL CC in the CQI and SRS transmission cycle period, may be used. Also, an additional signaling may be defined, wherein the additional signaling does not assign a DL CC linked to the corresponding UL CC as an active DL CC, and wherein the additional signaling configures the corresponding UL CC as an available CC only at that specific time. In this case, the additional signaling for the UL CC may be performed through a specific DL CC (e.g., anchor or primary DL CC), which is always being maintained in an active state in order to transmit the downlink control information.

Meanwhile, since the CQI corresponds to information indicating the channel state of the DL CC, the CQI is not required to be always transmitted through each UL CC. Accordingly, in FIG. 12, the CQI transmission, which is shown to be respectively transmitted through CC#1~CC#3, may be performed through one specific UL CC (e.g., anchor or primary UL CC). In addition, as shown in FIG. 12, when the CQI (or SRS) is transmitted through multiple UL CCs, also available herein is a method of transmitting the CQI (or SRS) using a TDM (Time Division Multiplexing) method between UL CCs by adjusting the transmission cycle period/offset between the UL CCs.

Embodiment 2-2

Control of an Uplink Transmission Considering the State of the DL CC (1)

When transmitting uplink information related to the DL CC, or, preferably, when transmitting downlink channel information (e.g., CQI) for the DL CC, there may be a situation wherein a linkage relation between the DL CC and the UL CC is not particularly configured. In this case, there may exist a plurality of methods for transmitting the UL CC through a CQI depending upon configurations, such as a CQI transmission scheme and transmission cycle period. For example, CQI information for multiple Di CCs may be transmitted through one UL CC (e.g., anchor or primary UL CC). In another example, when the CQI for multiple DL CCs is transmitted through multiple UL CCs, multiple CQI may be transmitted in a TDM (Time Division Multiplexing) method by adjusting the transmission cycle period between the UL CCs. When the cycle period is the same, multiple CQIs may be simultaneously transmitted through multiple UL CC. Additionally, CQI transmission may be performed by using many other methods. Only one transmission method may be used but, in some cases, a plurality of transmission methods may also be used.

Therefore, the present invention proposes a method of deciding the transmission or non-transmission of the CQI depending upon the active/non-active CC assignment of the DL CC, regardless of the CQI transmission method. More specifically, a CQI transmission cycle period, a timing offset, a UL CC that is to be transmitted, etc. are configured in advance for all of the assigned DL CCs, and when the CQI that is to be transmitted is associated with the active CC, the CQI is transmitted. And, when the CQI that is to be transmitted is associated with the non-active CC, the CQI is not transmitted. In this case, the exemplary condition given in S1130 of FIG. 11 may be changed to "if the uplink physical channel (signal) that is to be transmitted at the corresponding time is related to the non-active duration (or portion) of the DL CC."

Figure 13:
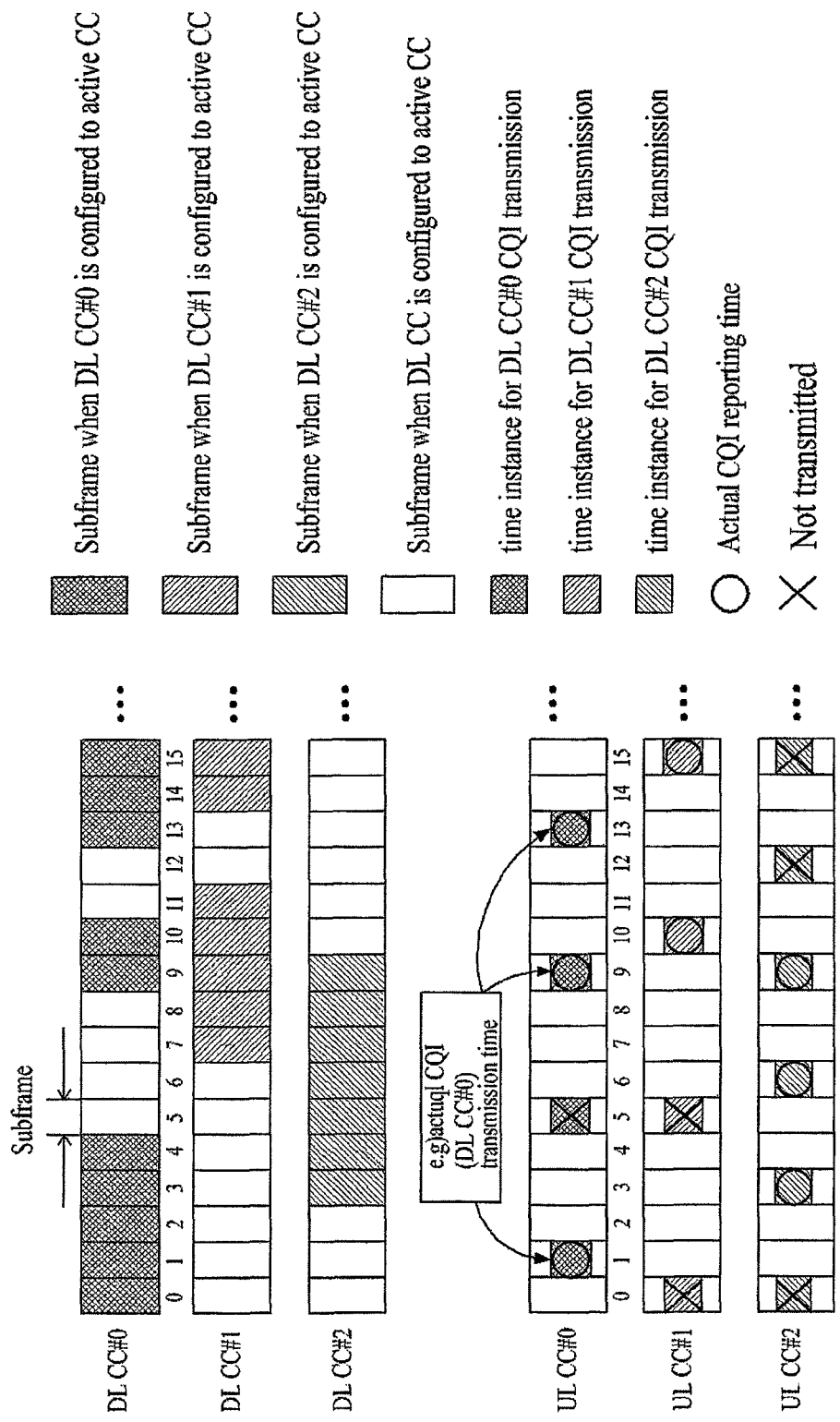
Figure 14:
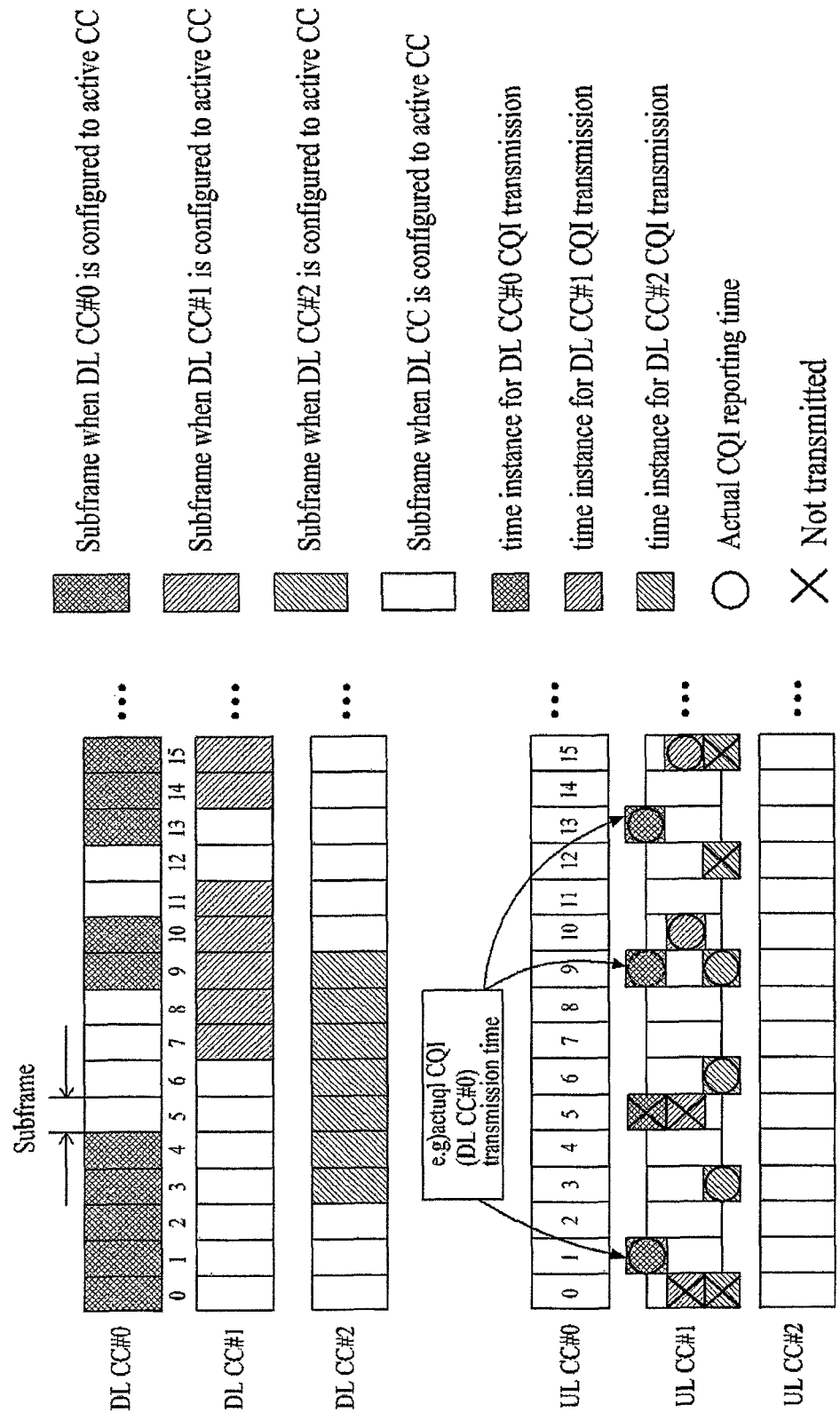
Figure 15:
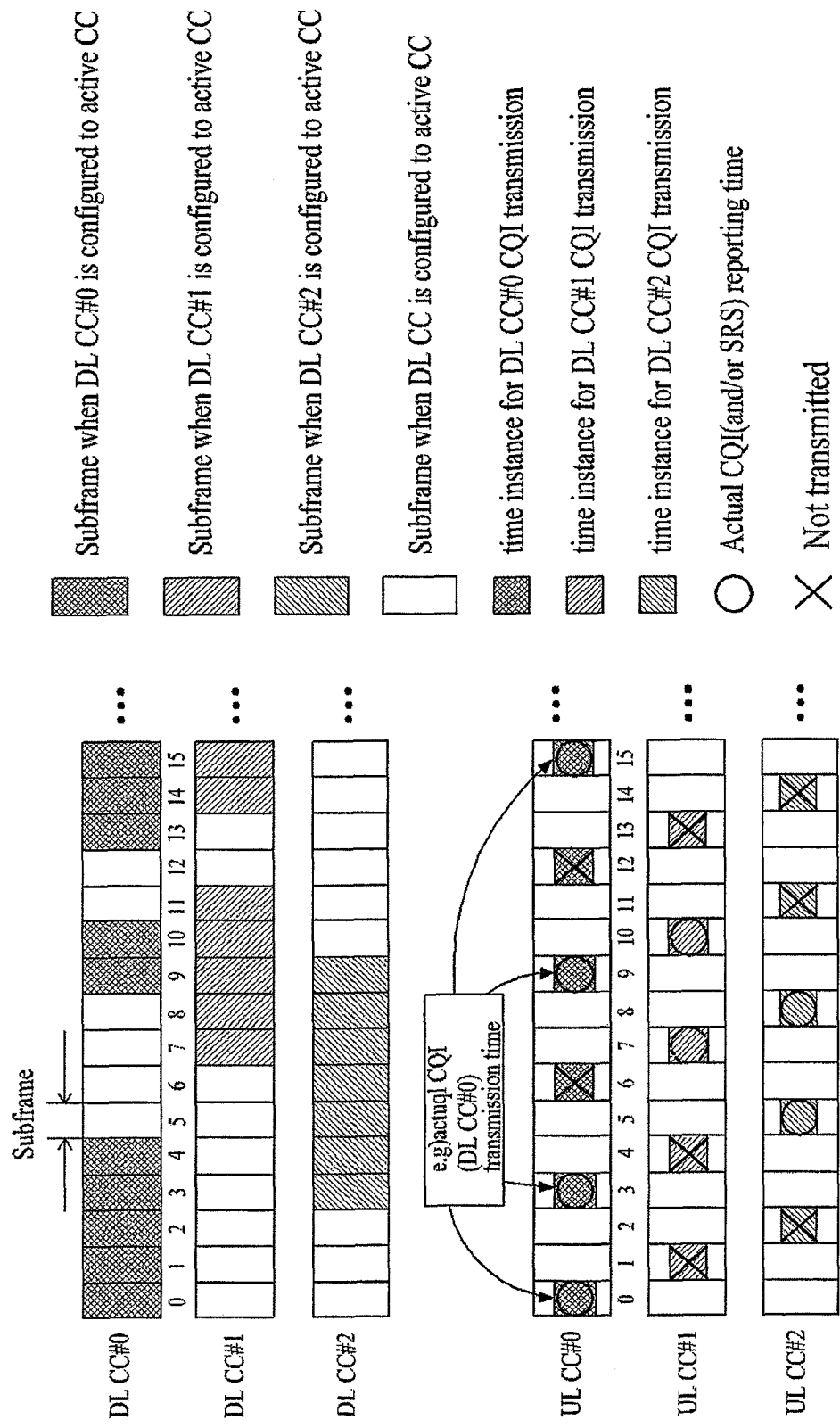

FIGS. 13~15 show examples of controlling uplink transmission in accordance with the DL CC state. In FIGS. 13~45, it is assumed that active/non-active assignment is applied only to the DL CC and not applied to the UL CC. More specifically, the UL CC may always transmit signals regardless of the state of the DL CC. Such assumption is just made in order to explain the present invention, and, therefore, configuring the UL CC to an available/non-available state, as shown in Embodiment 1 or 2-1, is not excluded. More specifically, the present invention may also be applied in cases where the UL CC is configured to an available/non-available state as time goes by.

FIG. 13 shows a case wherein a CQI transmission cycle period is separately configured for each DL CC, and wherein the CQI for multiple DL CCs is respectively transmitted through multiple UL CCs. In this case, depending upon whether or not the DL CC is assigned as an active/non-active CC, whether or not to transmit the CQI related to the corresponding DL CC is also decided. Referring to FIG. 13, the time when the CQI related to the DL CC#0 is transmitted is configured as subframe number 1, subframe number 5, subframe number 9, and subframe number 13 in UL CC#0. However, DL CC#0 is assigned as a non-active CC in subframe number 5. Therefore, the CQI related to DL CC#0 is transmitted only through subframe number 1, subframe number 9, and subframe number 13 in UL CC#0, and the CQI is not transmitted through subframe number 5. In particular, a user equipment performs a procedure of determining physical uplink channel assignment for a transmission of the CQI at a subframe on which the CQI shall be transmitted, in which the CQI is configured not to be transmitted when a corresponding UL CC is in a state of non-available UL CC. That is, when the corresponding UL CC in a state of non-available UL CC, the user equipment may not assign a physical channel to the CQI at the corresponding subframe. In FIG. 13, it is assumed that the CQI for subframe number n in DL CC#0 is transmitted through subframe number n in UL CC#0. However, this is merely an example given for the description of the present invention. Therefore, an index of a downlink subframe, wherein the downlink channel is actually measured, and an index of an uplink subframe, wherein the CQI is transmitted, may be different from one another. For example, the CQI being transmitted through subframe number 5 of UL DC#0 may be related to the channel quality of subframe number 3 in DL CC#0 (i.e., a difference of 2 subframes). In this case, whether or not to transmit the CQI through subframe number 5 of UL CC#0 may be decided based upon whether or not subframe number 3 of DL CC#0 is configured as a non-active state.

FIG. 14 shows a case wherein a CQI transmission cycle period is separately configured for each DL CC, and Wherein the CQI for multiple DL CCs is transmitted through a single UL CC. In this case, depending upon whether or not the DL CC is assigned as an active/non-active CC, whether or not to transmit the CQI related to the corresponding DL CC is also decided. A specific UL CC configured so that CQI for multiple DL CCs can be transmitted may be referred to as an anchor or primary UL CC. Referring to FIG. 14, the time when the CQI related to the DL CC#0 is transmitted is configured as subframe number 1, subframe number 5, subframe number 9, and subframe number 13 in UL CC#1 However, DL CC#0 is assigned as a non-active CC in subframe number 5. Therefore, the CQI related to DL CC#0 is transmitted only through subframe number 1, subframe number 9, and subframe number 13 in UL CC#1, and the CQI is not transmitted through subframe number 5. Similarly, UL CC#1 may send CQI information corresponding to each DL CC depending upon the active/non-active CC assignment for DL CC#1 and DL CC#2. In UL CC#1, subframe number 9 corresponds to the CQI transmission time of two DL CCs (DL CC#0, DL CC#2). And, at the same time, since both of the two corresponding DL CCs (DL CC#0, DL CC#2) are assigned as active CCs, the CQI information on both DL CCs (DL CC#0, DL CC#2) are transmitted simultaneously.

FIG. 15 shows a case wherein the CQI for multiple DL CCs is respectively transmitted to multiple UL CCs, yet wherein, considering the transmission cycle period/offset between the CCs, the overall transmission is performed by using the TDM method. With the exception of transmitting the CQI related to each DL CC by using the TDM method, the remaining process is identical to those described in FIG. 13 and FIG. 14. Therefore, since reference may be made to FIG. 13 and FIG. 14, detailed description of the same will be omitted for simplicity.

The above-described examples are given to facilitate the understanding of the present invention. Therefore, the present invention may also be applied to other diverse methods of the CQI transmission method in addition to the above-described examples. Also, in FIG. 13 to FIG. 15, the DL subframe index and the UL subframe index are used to facilitate the description of the present invention. Accordingly, identical DL/UL subframe indexes do not necessarily signify subframes at the same time point. In other words, a timing of a predetermined time interval may exist between the DL subframe and the UL subframe.

Embodiment 2-3

Control of an Uplink Transmission Considering the State of the DL CC (2)

This embodiment of the present invention proposes a method of transmitting CQI to the corresponding UL CC depending upon a predetermined configuration, when the time point corresponding to the transmission cycle period of the CQI matches with the time point where the DL CC is assigned as an active CC, and transmitting CQI by using another configuration, when the DL CC is assigned as a non-active CC at the time corresponding to the transmission cycle period of the CQI. For example, when the DL CC is configured as a non-active state, the user equipment may use another configuration (parameter) for the CQI (e.g., transmission cycle period/pattern/measurement band etc.) differently from the predetermined configuration.

This embodiment of the present invention may be used along with a CQI transmission stop operation proposed in Embodiment 2-2, or may be used optionally. More specifically, when the DL CC is configured as an active CC, the user equipment may perform CQI transmission in accordance with the predetermined CQI configuration, and, then, when the corresponding DL CC is configured as a non-active CC, the CQI transmission may be stopped (SRS off), as proposed in Embodiment 2-2, or the CQI may be transmitted in accordance with the modified configuration.

Figure 16:
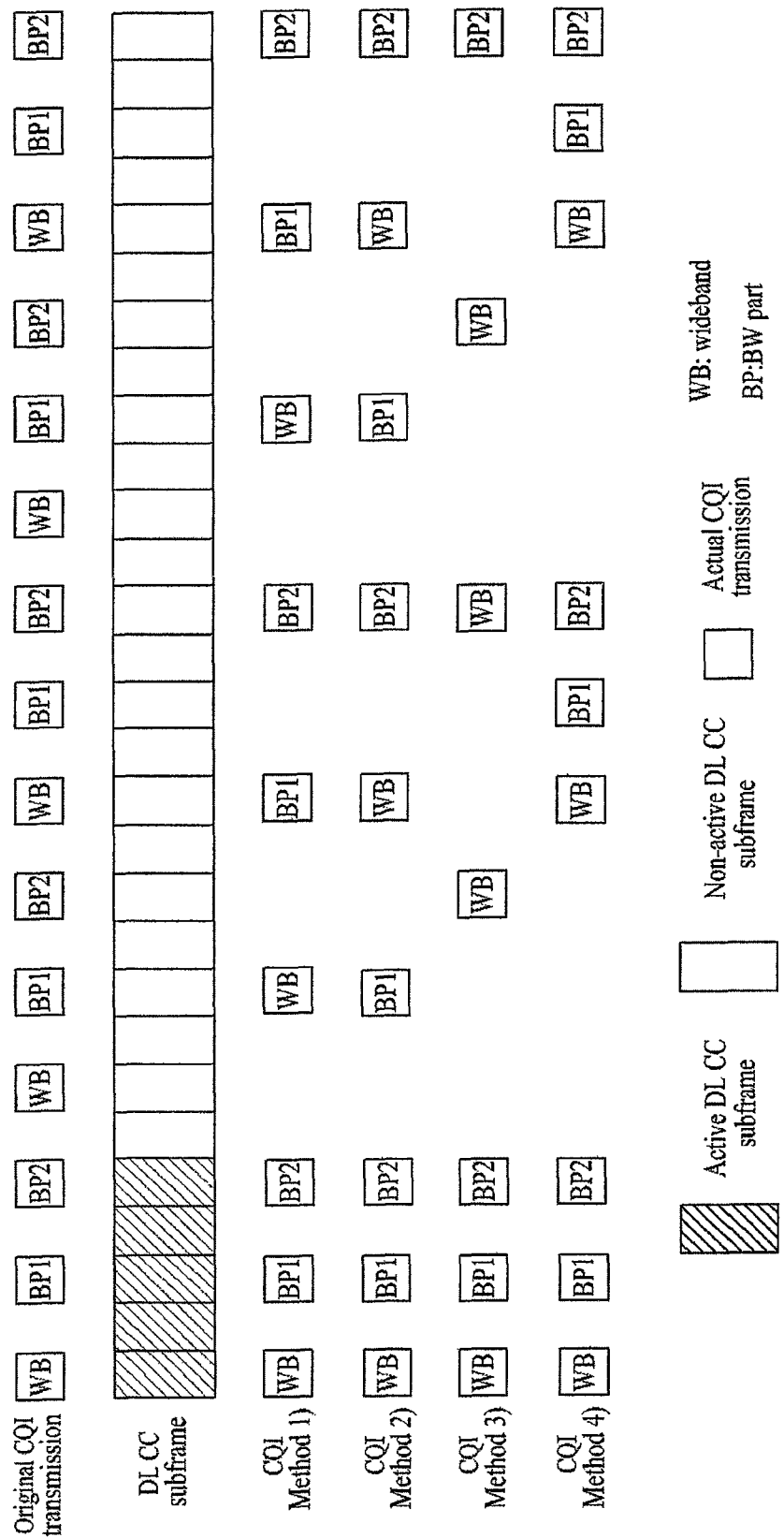

FIG. 16 illustrates an example of controlling uplink transmission of the CQI according to an embodiment of the present invention. According to the predetermined CQI configuration, it is assumed that the CQI cycle period is 2 ms (2 subframes) and that 2 BW parts (BP1~2) exist within a WB. In this case, the CQI is transmitted for each 2 ms in the order of WB.fwdarw.BP1.fwdarw.BP2. Referring to FIG. 16, when the DL CC is configured as a non-active CC from an active CC, the CQI may be transmitted in accordance with the following modified methods. The methods described below are given to facilitate the understanding of the present invention, and each method may be used independently or in combination.

Method 1-1: Only the CQI transmission cycle period may be modified from the predetermined CQI configuration, so as to perform CQI transmission. For example, when the DL CC is in a non-active state, the CQI transmission cycle period may be changed to an integral multiple of the predetermined cycle period (e.g., 2 ms×2=4 ms).

Method 1-2: Herein, Method 1-1 may be applied. However, the measurement band of the CQI being transmitted with the modified cycle period may be changed from the initial (or original) CQI transmission order. For example, when the DL CC is non-active, the transmission order of the CQI band may be changed from WB.fwdarw.BP1.fwdarw.BP2 to BP1.fwdarw.WB.fwdarw.BP2.

Method 1-3: The CQI transmission cycle period and measurement band (e.g., WB CQI) may both be modified from the predetermined CQI configuration, so as to perform CQI transmission. For example, when the DL CC is non-active, the CQI transmission cycle period is modified to 2 ms×3=6 ins, and the CQI measurement band may be modified to WB.fwdarw.WB.fwdarw.WB.fwdarw.BP2.

Method 1-4: Based upon the predetermined CQI configuration, only the CQI transmission cycle period for the same band may be modified (e.g., integral multiple). For example, when the WB.fwdarw.BP1.fwdarw.BP2 is transmitted, the transmission cycle period for each CQI is maintained at 2 ms. And, when a CQI is newly transmitted for the same band, the CQI transmission cycle period may be modified to an integral multiple of the predetermined CQI transmission cycle period (e.g., 2 ms×4=8 ms). Therefore, in FIG. 16, a CQI transmission time interval between BP2.fwdarw.WB becomes 8 ms.

Signaling for the embodiment of the present invention may be diversely implemented. For example, the signaling for the embodiment of the present invention may be included in a control signal (e.g., L1/L2 control signaling or RRC signaling) for configuring active/non-active CC, so as to be transmitted. In another example, a control channel (e.g., PDCCH) changing the CQI parameter for non-active DL CC may be separately configured.

More specifically, in case of CQI off, 1-bit signaling may be performed. And, in case of Method 1-1~1-4, modified CQI transmission cycle period/pattern/measurement band values, which are predetermined for non-active CCs may be applied based upon the 1-bit signaling, or the modified CQI transmission cycle period/pattern/measurement band values may be directly signaled. Also, a method of selecting/combining the CQI off and Methods 1-1~1-4 may also be used in accordance with one field. Also, 2 CQI configurations, which are to be applied to active and non-active CCs in Methods 1-1~1-4, may both be predetermined. For example, at least one of the transmission cycle period/pattern/measurement band may be configured in pairs in a common signaling information.

Embodiment 2-4

Control of an Uplink Transmission in Accordance with a UL CC State

An SRS is a signal transmitted from the user equipment to the base station in order to be informed of the uplink channel state. Therefore, even when the DL CC is assigned as a non-active CC, and even in a condition wherein the user equipment does not receive data via downlink, for the scheduling for an uplink data transmission of the user equipment, the base station should be informed of the uplink channel information of each UL CC. Accordingly, whether or not to transmit the SRS may be decided in accordance with the active/non-active state (or activation/non-activation) of the UL CC that is to be transmitted, regardless of the active/non-active CC assignment of the DL CC. The active/non-active state (or activation/non-activation) of the UL CC may be dynamically or semi-statically modified. For simplicity, the active state of the UL CC may be referred to as an activated UL CC, and the non-active state of the UL CC may be referred to as a deactivated UL CC. In the embodiment of the present invention, the deactivated UL CC may be defined as described in the example shown in Embodiment 1. And, more particularly, the deactivated UL CC may be defined as a UL CC configured to have a limited transmission only for the uplink data channel (e.g., PUSCH), or as a UL CC configured to have a limited transmission (e.g., PUCCH) of some control information along with the data transmission.

Therefore, this embodiment of the present invention proposes a method of transmitting SRS on the corresponding UL CC depending upon a predetermined configuration, when the time point corresponding to the transmission cycle period of the SRS matches with the time when the UL CC is assigned as an active CC, and transmitting SRS by using another configuration, when the UL CC is assigned as a non-active CC at the time corresponding to the transmission cycle period of the SRS. For example, when the UL CC is configured in a non-active state, the user equipment may use another configuration (parameter) for the SRS (e.g., transmission cycle period/pattern/measurement band etc.) differently from the predetermined configuration.

In the embodiment of the present invention, the method of modifying activation/deactivation of the UL CC is not limited. For example, the UL CC may be activated/deactivated separately from the DL CC, or the UL CC may be activated/deactivated in accordance with the active/non-active CC assignment for the DL CC. Therefore, when the active/non-active state of the UL CC is decided by the DL CC linked to the corresponding UL CC, the modification of the parameter for SRS transmission may be applied to the UL CC linked to the non-active DL CC. Conversely, when the active/non-active state of the UL CC is decided regardless of the DL CC, the modification of the parameter for SRS transmission may be applied to the non-active UL CC. Furthermore, the transmission cycle period of the SRS may be independently assigned among the UL CCs. And, the cycle period among multiple UL CCs may be adjusted in order to perform assignment so that transmission can be performed by using the TDM method. Additionally, the assignment may be performed by using other diverse methods.

The embodiment of the present invention may be used along with the SRS transmission stop operations proposed in Embodiment 2-1, or the embodiment of the present invention may be used optionally. More specifically, when the UL CC is configured as an active CC, the user equipment may perform SRS transmission in accordance with the predetermined SRS configuration. Then, when the corresponding UL CC is configured as an inactive CC, as proposed in Embodiment 2-1, the SRS transmission may be stopped (SRS off) or transmission may be performed in accordance with a modified SRS configuration.

Figure 17:
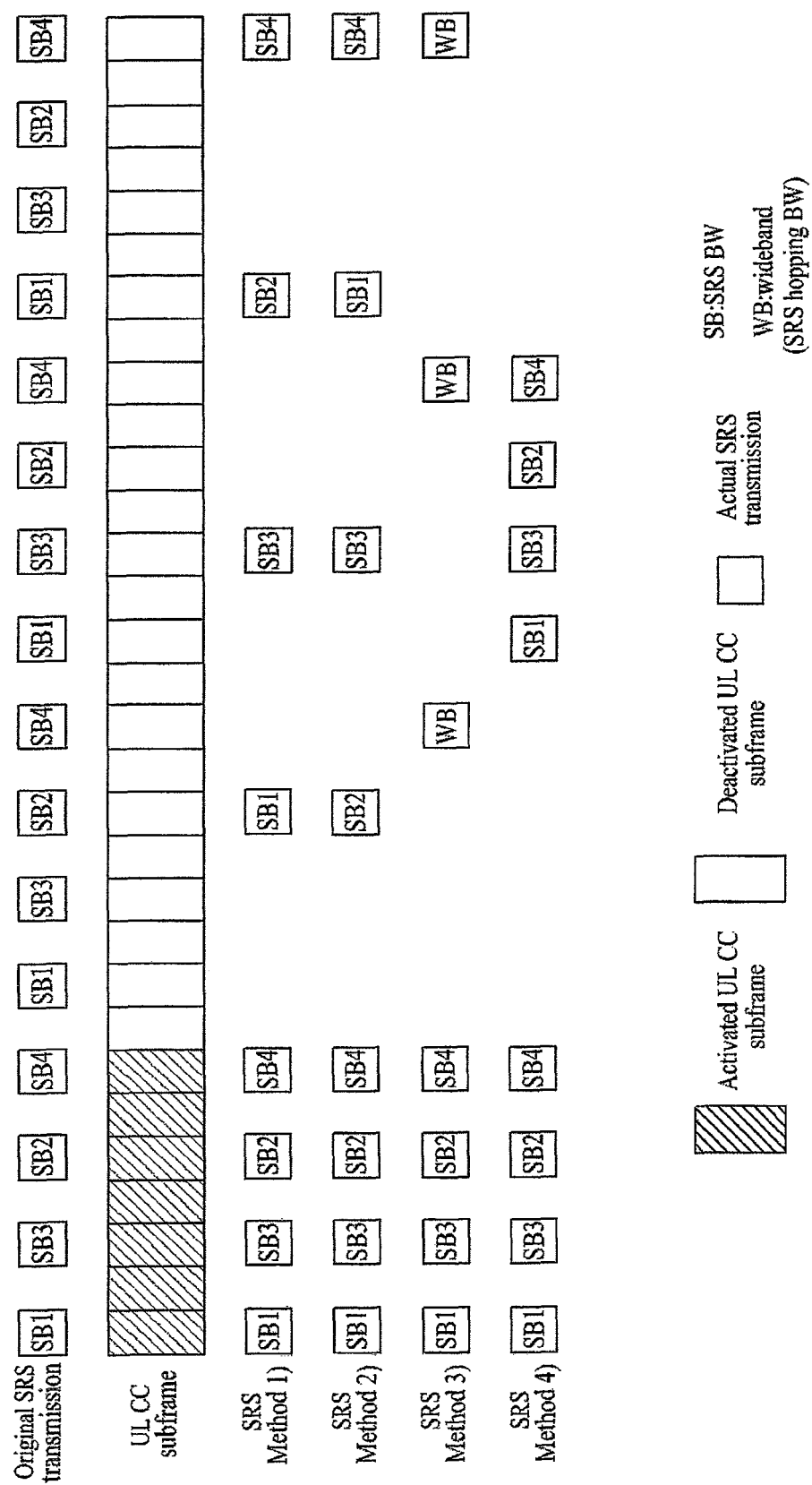

FIG. 17 shows an example of controlling an uplink transmission of an SRS according to the embodiment of the present invention, According to the predetermined SRS configuration, an SRS cycle period is 2 ms (2 subframes) and 4 SRS BWs (SB1~4) exist within an SRS hopping BW (WB). In this case, the SRS is transmitted at each 2 ms, and frequency hopping is performed in the order of SB1.fwdarw.SB3.fwdarw.SB2.fwdarw.SB4.

Referring to FIG. 17, when the UL CC is configured as a non-active CC from an active CC, the SRS may be transmitted in accordance with the following modified methods. The methods described below are given to facilitate the understanding of the present invention, and each method may be used independently or in combination.

Method 2-1: Only the SRS transmission cycle period may be modified from the predetermined S RS configuration, so as to perform SRS transmission. For example, when the UL CC is in a non-active state, the SRS transmission cycle period may be changed to an integral multiple of the predetermined cycle period (e.g., 2 ms×3=6 ms).

Method 2-2: Herein, Method 2-1 may be applied. However, the transmission band of the SRS being transmitted with the modified cycle period may be changed from the initial (or original) SRS transmission order. For example, when the UL CC is non-active, the transmission order of the SRS band may be changed from SB1.fwdarw.SB3.fwdarw.SB2.fwdarw.SB4 to SB2.fwdarw.SB3.fwdarw.SB1.fwdarw.SB4.

Method 2-3: The SRS transmission cycle period and transmission band may both be modified from the predetermined SRS configuration, so as to perform SRS transmission. In this case, when the UL CC is in a non-active state, the SRS BW may be configured to be equal to or larger than the SRS hopping BW. When the UL CC is non-active, the SRS transmission cycle period is modified to 2 ms×4=8 ms, and the SRS transmission band may be modified to WB.

Method 2-4:

Based upon the predetermined SRS configuration, only the SRS transmission cycle period for the same band may be modified (e.g., integral multiple). For example, when 4 SRS BWs within the SRS hopping BW are transmitted, the SRS transmission cycle period is maintained at 2 ms. And, when an SRS is newly transmitted for the same band, the SRS transmission cycle period may be modified to an integral multiple of the predetermined SRS transmission cycle period (e.g., 2 ms×5=10 ins). Therefore, in FIG. 17, an SRS transmission time interval between SB4.fwdarw.SB1 becomes 10 ms.

Signaling for the embodiment of the present invention may be diversely implemented in accordance with the active/non-active UL CC configuration method. For example, when the UL CC is activated/deactivated by the active/non-active CC assignment of the DL CC, the signaling for the embodiment of the present invention may be performed through a control signal (e.g., L1/L2 control signaling or RRC signaling) for configuring active/non-active DL CC. In another example, when the UL CC is activated/deactivated regardless of the DL CC, the signaling for the embodiment of the present invention may be performed through a control signal (e.g., L1/L2 control signaling or RRC signaling) for configuring active/non-active UL CC. In yet another example, a control channel (e.g., PDCCH) changing the SRS parameter for non-active UL CC may be separately configured.

More specifically, in case of SRS off, 1-bit signaling may be performed. And, in case of Method 2-1~2-4, modified SRS transmission cycle period/pattern/transmission band values, which are predetermined for non-active UL CCs may be applied based upon the 1-bit signaling, or the modified SRS transmission cycle period/pattern/transmission band values may be directly signaled. Also, a method of selecting/combining the SRS off and Methods 2-1~2-4 may also be used in accordance with one field. Also, 2 SRS configurations, which are to be applied to active and non-active UL CCs in Methods 2-1~2-4, may both be predetermined. For example, at least one of the transmission cycle period/pattern/transmission band may be configured in pairs in a common signaling information.

Figure 18:
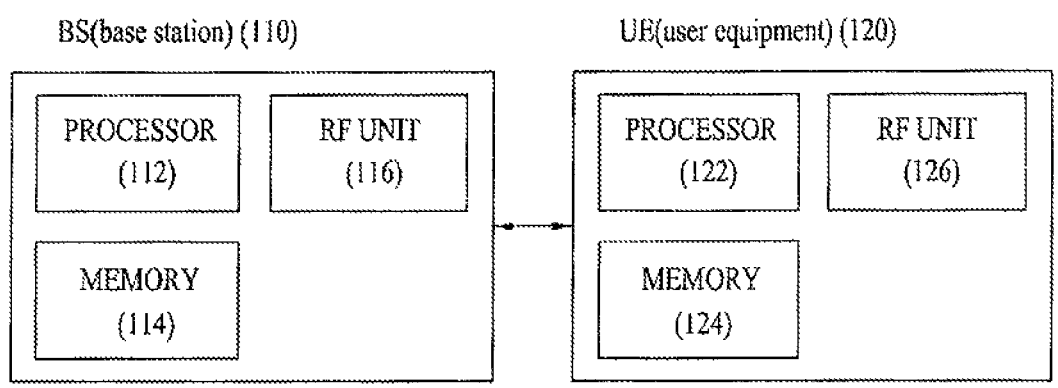
FIG. 18 illustrates examples of a base station and a user equipment that can be applied to an embodiment of the present invention.

FIG. 18 illustrates exemplary base station and user equipment that be applied to the embodiment of the present invention.

Referring to FIG. 18, a wireless communication system includes a base station (BS) (110) and a user equipment (UE) (or terminal) (120). In a downlink, a transmitter corresponds to a portion of the base station (110), and a receiver corresponds to a portion of the UE (120). In an uplink, a transmitter corresponds to a portion of the UE (120), and a receiver corresponds to a portion of the base station (110). The base station (110) includes a processor (112), a memory (114), and a radio frequency (RF) unit (116). The processor (112) may be configured to embody the procedures and/or methods proposed in the present invention. The memory (114) is connected to the processor (112) and stores diverse information associated with the operation of the processor (112). The RF unit (116) is connected to the processor (112) and transmits and/or receives a radio signal. The UE (or terminal) (120) includes a processor (122), a memory (124), and an RF unit (126). The processor (122) may be configured to embody the procedures and/or methods proposed in the present invention. The memory (124) is connected to the processor (122) and stores diverse information associated with the operation of the processor (122). The RF unit (126) is connected to the processor (122) and transmits and/or receives a radio signal. The base station (110) and/or the UE (120) may have a single antenna or multiple antennae.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the base station and the user equipment. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention may be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

The present invention may be applied to a wireless communication system. More specifically, the present invention may be applied to a communication method using a carrier aggregation and apparatus therefore.

what is claimed is:

1. A method for a base station to receive an uplink transmission from a user equipment configured with multiple uplink component carriers including a first uplink component carrier and a second uplink component carrier in a wireless communications system, the method comprising:
    transmitting, to the user equipment, Radio Resource Control (RRC) configuration information for a Sounding Reference Signal (SRS), the RRC configuration information including information for periodically receiving the SRS from the user equipment; and
    performing a procedure for periodically receiving the SRS from the user equipment on the second uplink component carrier of the multiple uplink component carriers in use of the RRC configuration information,
    wherein, when the second uplink component carrier on which the SRS is periodically received is in an active state at a time for receiving the SRS, the SRS is received on the second uplink component carrier on which the SRS is periodically received, and, when the second uplink component carrier on which the SRS is periodically received is in a non-active state at a time for receiving the SRS, no SRS is received on the second uplink component carrier on which the SRS is periodically received,
    wherein a first downlink component carrier is paired with the first uplink component carrier, and the first downlink and uplink component carriers are always in the active state,
    wherein the active/non-active states of the second uplink component carrier are controlled by using layer 2 (L2) control information, and the second uplink component carrier and a second downlink component carrier paired with the second uplink component carrier have a same state among the active/non-active states; and
    wherein the second uplink component carrier is in the non-active state, when all multiple downlink component carriers paired with the second uplink component carrier are in the non-active state.

2. The method of claim 1, wherein the uplink component carrier on which the SRS is periodically received is configured to allow an uplink signal reception from the user equipment in the active state, and the uplink component carrier on which the SRS is periodically received is configured not to allow an uplink signal reception from the user equipment in the non-active state.

3. A base station configured to receive an uplink transmission from a user equipment configured with multiple uplink component carriers including a first uplink component carrier and a second uplink component carrier in a wireless communications system, the base station comprising:
    a radio frequency (RF) unit; and
    a processor configured to:
        transmit, to the user equipment, Radio Resource Control (RRC) configuration information for a Sounding Reference Signal (SRS), the RRC configuration information including information for periodically receiving the SRS from the user equipment, and
        perform a procedure for periodically receiving the SRS from the user equipment on the second uplink component carrier of the multiple uplink component carriers in use of the RRC configuration information,
    wherein, when the second uplink component carrier on which the SRS is periodically received is in an active state at a time for receiving the SRS, the SRS is received on the second uplink component carrier on which the SRS is periodically received, and, when the second uplink component carrier on which the SRS is periodically received is in a non-active state at a time for receiving the SRS, no SRS is received on the second uplink component carrier on which the SRS is periodically received,
    wherein a first downlink component carrier is paired with the first uplink component carrier, and the first downlink and uplink component carriers are always in the active state,
    wherein the active/non-active states of the second uplink component carrier are controlled by using layer 2 (L2) control information, and the second uplink component carrier and a second downlink component carrier paired with the second uplink component carrier have a same state among the active/non-active states; and
    wherein the second uplink component carrier is in the non-active state, when all multiple downlink component carriers paired with the second uplink component carrier are in the non-active state.

4. The base station of claim 3, wherein the uplink component carrier on which the SRS is periodically received is configured to allow an uplink signal reception from the user equipment in the active state, and the uplink component carrier on which the SRS is periodically received is configured not to allow an uplink signal reception from the user equipment in the non-active state.

* * * * *